US010407535B2

(12) United States Patent
Li et al.

(10) Patent No.: US 10,407,535 B2
(45) Date of Patent: *Sep. 10, 2019

(54) 3D PRINTABLE LIQUID CRYSTALLINE ELASTOMERS WITH TUNABLE SHAPE MEMORY BEHAVIOR AND BIO-DERIVED RENDITIONS

(71) Applicants: UT-Battelle, LLC, Oak Ridge, TN (US); Washington State University, Pullman, WA (US)

(72) Inventors: Yuzhan Li, Pullman, WA (US); Orlando Rios, Knoxville, TN (US); Alexander Johs, Knoxville, TN (US); Michael Richard Kessler, Pullman, WA (US)

(73) Assignees: UT-BATTELLE, LLC, Oak Ridge, TN (US); Washington State University, Pullman, WA (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/091,182

(22) Filed: Apr. 5, 2016

(65) Prior Publication Data
US 2016/0289491 A1 Oct. 6, 2016

Related U.S. Application Data

(60) Provisional application No. 62/143,691, filed on Apr. 6, 2015.

(51) Int. Cl.
*C08G 59/42* (2006.01)
*C08L 63/00* (2006.01)
(Continued)

(52) U.S. Cl.
CPC ....... *C08G 59/686* (2013.01); *C08G 59/4207* (2013.01); *C08L 63/00* (2013.01); *B33Y 10/00* (2014.12); *B33Y 70/00* (2014.12)

(58) Field of Classification Search
CPC ................ C08G 59/4207; C08G 59/42; C08L 63/00–10; C09D 163/00–10; C09J 163/00–10; C08J 2363/00–10
See application file for complete search history.

(56) References Cited

U.S. PATENT DOCUMENTS 5,270,404 A * 12/1993 Earls .................... C07D 303/22
525/481
5,811,504 A 9/1998 Shiota et al.
(Continued)

OTHER PUBLICATIONS

Li et al., "Controlled Shape Memory Behavior of a Smectic Main-Chain Liquid Crystalline Elastomer," Macromolecules 48, 2864-2874 (2015).*
(Continued)

*Primary Examiner* — Kregg T Brooks
(74) *Attorney, Agent, or Firm* — Scully, Scott, Murphy & Presser, P.C.

(57) ABSTRACT

Described herein are liquid crystalline elastomer compositions comprising aromatic epoxy units crosslinked with alkylene diacid units having alkylene segments containing at least one methylene unit, and/or aromatic epoxy units crosslinked with polyphenolic units, wherein the aromatic epoxy units and alkylene diacid units and/or polyphenolic units are in a molar ratio that results in the liquid crystalline elastomer composition exhibiting a glass transition temperature ($T_g$) and a thermal stability of the liquid crystalline phase ($T_{lc}$) that make them particularly suitable as shape memory materials and for use in methods of additive manufacturing. Methods for producing these compositions and their use in additive manufacturing processes are also described.

17 Claims, 22 Drawing Sheets

(51) Int. Cl.
*C08G 59/68* (2006.01)
*B33Y 70/00* (2015.01)
*B33Y 10/00* (2015.01)

(56) References Cited

U.S. PATENT DOCUMENTS

| | | |
|---|---|---|
| 7,794,623 B2 | 9/2010 | Matayabas, Jr. et al. |
| 8,309,632 B2 | 11/2012 | Su et al. |
| 2011/0319524 A1* | 12/2011 | Leibler .................. B29C 73/02 523/446 |

OTHER PUBLICATIONS

Ambrogi et al., "Liquid crystalline elastomers based on diglycidyl terminated rigid monomers and aliphatic acids. Part 1. Synthesis and Characterization," Polymer 46, 2105-2121 (2005).*
Giamberini et al., "Lightly crosslinked liquid crystalline epoxy resins: the effect of rigid-rod length and applied stress on the state of order of the cured thermoset," Macromol. Chem. Phys. 198, 3185-3196 (1997).*
Malucelli et al., "Freezing the orientation of a nematic stretched elastomer by photocrosslinking," Polymer 50, 1948-1956 (2009).*
Ortiz, C. et al., "Deformation of a Polydomain, Smectic Liquid Crystalline Elasomer", Macromolecules, (1998), vol. 31, pp. 8531-8539.
Burke, K.A. et al., "Soft shape memory in main-chain liquid crystalline elastomers", J. Mater. Chem., (2010), vol. 20, pp. 3449-3457.

* cited by examiner

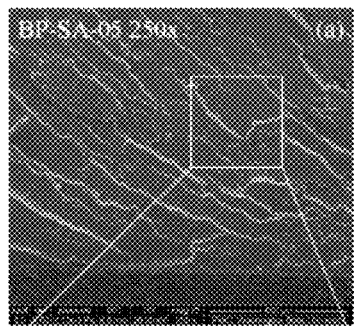 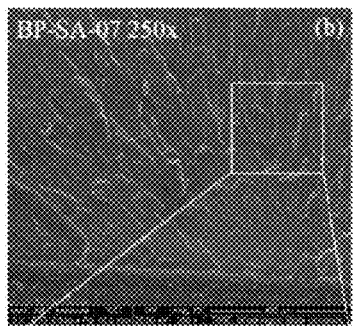 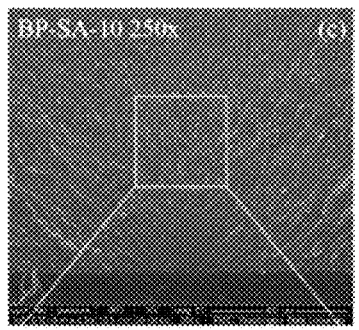
FIG. 7a   FIG. 7b   FIG. 7c
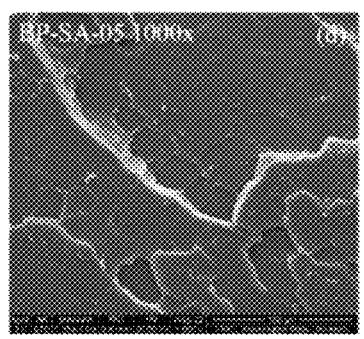 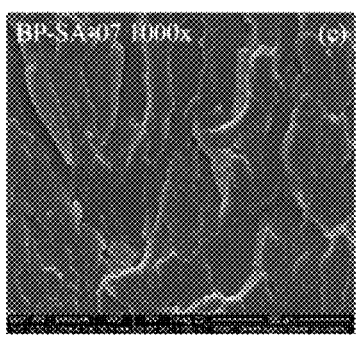 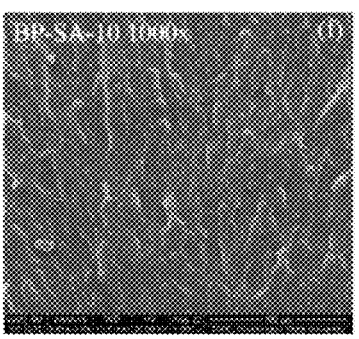
FIG. 7d   FIG. 7e   FIG. 7f

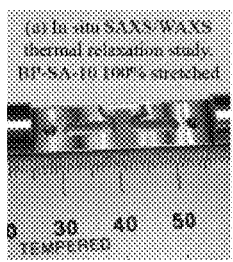 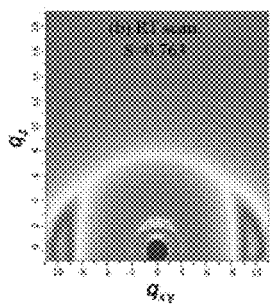 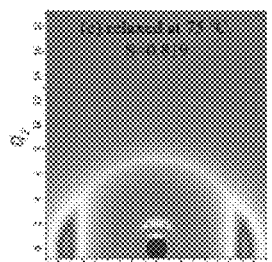 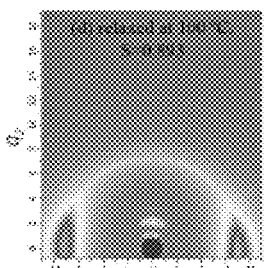
FIG. 15a  FIG. 15b  FIG. 15c  FIG. 15d
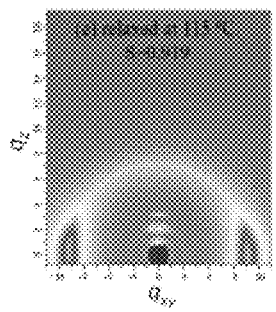 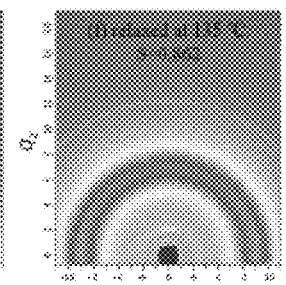 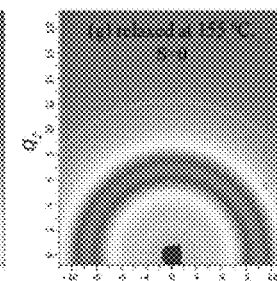 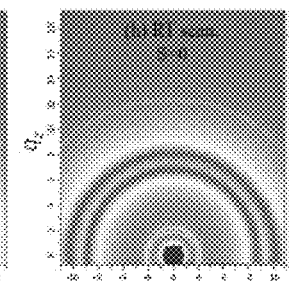
FIG. 15e  FIG. 15f  FIG. 15g  FIG. 15h $R_1$ = H, OCH$_3$, Ar
$R_2$ = H, OCH$_3$
$R_3$ = CH$_2$OH

US 10,407,535 B2

3D PRINTABLE LIQUID CRYSTALLINE ELASTOMERS WITH TUNABLE SHAPE MEMORY BEHAVIOR AND BIO-DERIVED RENDITIONS

CROSS REFERENCE TO RELATED APPLICATION

The present application claims benefit of U.S. Provisional Application No. 62/143,691, filed on Apr. 6, 2015, all of the contents of which are incorporated herein by reference.

GOVERNMENT SUPPORT

This invention was made with government support under Prime Contract No. DE-AC05-00OR22725 awarded by the U.S. Department of Energy, and Grant No. FA9550-12-1-0108 awarded by the Air Force Office of Scientific Research (USAF/AFOSR). The government has certain rights in the invention.

FIELD OF THE INVENTION

The present invention relates, generally, to liquid crystalline elastomers with tunable thermomechanical properties and shape memory behaviors, as well as additive manufacturing processes in which such elastomers are used.

BACKGROUND OF THE INVENTION

Shape memory polymers (SMP) are smart materials that can recover their original shape from a deformed state under external stimuli. SMPs generally consist of crosslinked polymer networks that determine the permanent shape of the material, and switching segments that are capable of being oriented and solidified to fix a temporary shape. The shape recovery is driven by the entropic force of the switching domains, which tend to gain entropy and return to the random conformation during phase transitions, such as glass transition, liquid crystalline (LC) transition, and melting transition.

Powered by the reversible LC phase transition and the unique coupling between LC mesogens and polymer networks, liquid crystalline elastomers (LCE) represent a special class of SMPs. They exhibit reversible shape change upon the application of external stimuli, such as heat, light, and magnetic field, which makes them excellent candidates for artificial muscles, sensors, and lithography substrates. The importance of LCEs has been realized in their great potential for a wide variety of applications ranging from biomedical (e.g., biosensors, drug delivery systems, and intelligent implants) to aerospace engineering (e.g., packing materials, morphing structures, and self-assembling devices). A number of LCEs with different LC phases and network structures have been synthesized and characterized. These materials exhibit a wide variety of shape memory and actuating behaviors.

However, despite their interesting properties and remarkable potential, practical applications of LCEs are limited due to the difficulties in tailoring thermal transition temperatures and thermomechanical properties of the materials for rendering them specifically useful in additive manufacturing applications. Thus, there would be a significant benefit in LCEs in which such properties are tailored, particularly for use in additive manufacturing processes.

SUMMARY OF THE INVENTION

In one aspect, the invention is directed to liquid crystalline elastomer compositions having unique combinations of thermal transition temperatures and thermomechanical properties that make these compositions particularly suited for use in additive manufacturing processes. The liquid crystalline elastomer compositions considered herein preferably exhibit a glass transition temperature ($T_g$) of at least 25° C. and a thermal stability of the liquid crystalline phase ($T_{lc}$) of at least 50° C. The liquid crystalline elastomer compositions may also exhibit a degree of liquid crystallinity ($\Delta H_{lc}$) of at least 10 J/g.

In a first set of embodiments, the liquid crystalline elastomer composition includes aromatic epoxy units crosslinked with alkylene diacid units having alkylene segments containing at least one methylene unit, wherein the aromatic epoxy units and alkylene diacid units are in a molar ratio that results in the liquid crystalline elastomer composition exhibiting the properties described above. The molar ratio of aromatic epoxy units to alkylene diacid units can be, for example, above 0.5 and up to 1. In a second set of embodiments, the liquid crystalline elastomer composition includes aromatic epoxy units crosslinked with polyphenolic (e.g., lignin) units. As lignin, in particular, is a widely available renewable biopolymer, incorporation of lignin provides at least the advantages of lower cost and biodegradability.

In another aspect, the invention is directed to a method of producing the liquid crystalline elastomer composition. For the epoxy-diacid system, the method includes crosslinking aromatic epoxy molecules with alkylene diacid molecules containing at least one methylene unit at a processing temperature of at least 120° C. to 250° C., wherein the aromatic epoxy molecules and alkylene diacid molecules are in a molar ratio that results in the liquid crystalline elastomer composition exhibiting the properties described above. For the epoxy-lignin system, the method includes crosslinking aromatic epoxy molecules with lignin molecules in a molar ratio of phenol groups (from the lignin) to epoxy groups (in the aromatic epoxy units) of 3:2 to 1:2, or in a molar ratio that results in the epoxy-lignin elastomer having any one or more of the $T_g$, $T_{lc}$, or $\Delta H_{lc}$ properties described above.

The methods described herein provide a unique way of preparing LCEs having unique combinations of thermal transition temperatures and thermomechanical properties that make these compositions particularly suited for use in additive manufacturing processes and with tunable shape memory behaviors. Microstructures of the LCEs, including liquid crystallinity and crosslinking network, were modified by adjusting the stoichiometric ratio of the reactants. These structural modifications resulted in LCEs with different liquid crystallinity, crosslink density, and network rigidity, thereby leading to LCEs with tunable thermal properties, dynamic mechanical properties, shape memory behaviors, thermomechanical properties, and thermal degradation behaviors. The LCEs described herein can thus be directed to a wide range of applications, including artificial muscles, sensors, lithography substrates, and shape memory materials. The presence of crosslinked LC domains and their reversible phase transitions upon heating and cooling were found to be crucial for the shape memory behavior of the LCEs.

BRIEF DESCRIPTION OF THE DRAWINGS

FIGS. 1a-1c. Thermal properties, liquid crystalline behaviors, and dynamic mechanical properties of the liquid crystalline elastomers (LCEs) under study (denoted as BP-SA-05, BP-SA-07, and BP-SA-10, in order of decreasing amount of SA, which designates "sebacic acid," and where BP indicates 4,4'-diglycidyloxybiphenyl) determined by DSC and DMA testing, wherein FIG. 1a shows first cooling and second heating DSC scans, FIG. 1b shows storage modulus E', and FIG. 1c shows dissipation factor tan δ.

FIGS. 4d-4f correspond to BP-SA-07 at unstretched (S=0), stretched 100%, and stretched 200% modes, respectively; and FIGS. 4g-4i correspond to BP-SA-10 at unstretched (S=0), stretched 100%, and stretched 200% modes, respectively.

FIGS. 5a-5c. Quantified SAXS/WAXS data of the LCEs with different composition, wherein FIGS. 5a, 5b, and 5c show data for BP-SA-05, BP-SA-07, and BP-SA-10, respectively.

FIGS. 7a-7f. Micrograph photos showing fracture surfaces of the LCEs with different compositions, wherein FIGS. 7a-7c show BP-SA-05, BP-SA-07, and BP-SA-10 LCEs, respectively, at 250× magnification and FIGS. 7d-7f show BP-SA-05, BP-SA-07, and BP-SA-10 LCEs, respectively, at 1000× magnification.

FIGS. 9a-9d. Graphs showing static tensile behavior and cyclic actuating behavior of the LCEs with different composition, wherein FIG. 9a shows stress-strain curves of the BP-SA-05, BP-SA-07, and BP-SA-10 LCEs and FIGS. 9b-9d show cyclic thermomechanical tensile data for the BP-SA-05, BP-SA-07, and BP-SA-10 LCEs, respectively.

FIG. 11a exhibits a permanent shape; FIG. 11b exhibits a deformed to temporary shape 1 at 160° C. and cooled to room temperature; FIG. 11c exhibits a deformed to temporary shape 2 at 85° C. and cooled to room temperature; FIG. 11d exhibits a retrieved temporary shape 1 at 85° C., and FIG. 11e exhibits a retrieved permanent shape at 160° C.

FIG. 13a is a graph showing cyclic thermomechanical compression data for the BP-SA-05, BP-SA-07, and BP-SA-10 LCEs. FIG. 13b is a graph showing coefficient of thermal expansion of the LCEs determined from the second heating processing.

FIGS. 14a-14d. Graphs showing results of isostrain tests of the LCEs with different compositions, wherein FIGS. 14a-14c show results of original test profiles of the isostrain tests for the BP-SA-05, BP-SA-07, and BP-SA-10 LCEs, respectively, and FIG. 14d compares the generated stress for the three LCEs.

FIG. 15a-15h. In situ SAXS/WAXS thermal relaxation results for the BP-SA-10 LCE at 100% stretched mode, wherein FIG. 15a is a photo of the LCE with one end fixed on the sample stage and FIGS. 15b-15h are scattering patterns of the LCE at different relaxation temperatures.

FIG. 17a depicts the effect of a static magnetic field perpendicular and parallel to the plane of an aromatic system, and FIG. 17b is a schematic representation of a nematic phase.

FIGS. 19a-19c. Depiction of a crosslinking reaction between an exemplary epoxy molecule and lignin, wherein FIG. 19a depicts the representative epoxy molecule, FIG. 19b depicts free aromatic hydroxyl functional groups of lignin, and FIG. 19c depicts a crosslinked biopolymer epoxy-lignin product.

DETAILED DESCRIPTION OF THE INVENTION

Figure 1A:
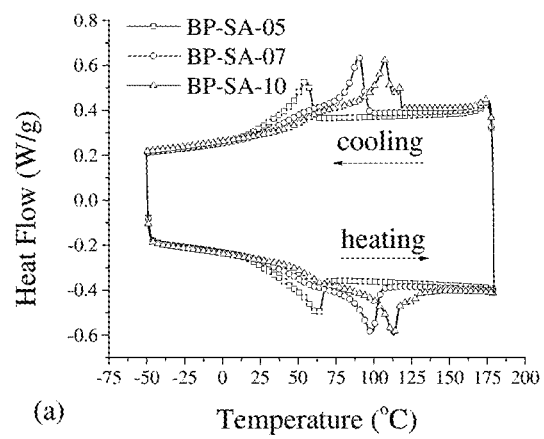

In one aspect, the invention is directed to a liquid crystalline elastomer composition. As well known in the art, the term "liquid crystalline" (i.e., "LC") refers to a state of matter in which a liquid possesses a level of order indicative of a semi-crystalline or crystalline state. The liquid crystalline behavior may be more particularly any of the thermotropic phases known in the art, such as a nematic phase, smectic phase, chiral (cholesteric) phase, or discotic phase. The molecules in a liquid crystalline material exhibit some extent of orientational order between a solid and a liquid, but they generally do not exhibit long-range order. The liquid crystalline state may be achieved either lyotropically (i.e., by varying compositional aspects of the LC) or thermotropically (i.e., by varying temperature). As also well known in the art, the term "liquid crystalline elastomer" (also denoted as "LCE") refers to a loosely or weakly cross-linked network of liquid crystal polymers, typically having rigid-rod liquid crystalline molecules incorporated either directly or via a spacer group to the polymer backbone. By virtue of the polymer networks, the LCE possesses both the order of liquid crystals and the elasticity of elastomers. The LCE exhibits properties of elastomers (e.g., entropic elasticity) and liquid crystallinity (i.e., self-organization). For further discussion of LCEs, reference is made to, e.g., C. Ortiz et al., *Macromolecules*, 31, pp. 8531-8539, 1998; B. T. Michal, et al., *Macromolecules*, 48(10), pp. 3239-3246, 2015; K. A. Burke et al., *J. Mater. Chem.*, 20, pp. 3449-3457, 2010; T.

Ikeda et al., *Angew. Chem. Int. Ed. Engl.*, 46(4), pp. 506-528, 2007; and D. Iqbal et al., *Materials*, 6, pp. 116-142, 2013. In some embodiments, the LCE considered herein is a shape-changing polymer (SCP), or more particularly, a shape-memory polymer (SMP), which is a smart material that can recover its original shape from a deformed state under external stimuli, e.g., K. A. Burke et al. (supra), B. T. Michal et al. (supra), and D. Iqbal et al. (supra).

For purposes of the invention, the LCEs considered herein preferably exhibit a glass transition temperature ($T_g$) of at least or above 25° C., 30° C., 35° C., 40° C., 45° C., 50° C., 55° C., 60° C., 65° C., or 70° C., or a $T_g$ within a range bounded by any two of the foregoing values. The glass transition temperature is generally understood as the temperature at which a material transitions from a hard glassy state into a molten state.

The LCEs considered herein preferably additionally or alternatively exhibit a thermal stability of the liquid crystalline phase ($T_{lc}$) of at least or above 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., or 150° C., or a $T_{lc}$ within a range bounded by any two of the foregoing values. The LC phase transition ($T_{lc}$) is generally understood as the temperature at which liquid crystals transform from one phase to another with a change of molecular order. This reversible phase transition determines the shape-programming and shape-recovering temperature of a LCE.

The LCEs considered herein preferably additionally or alternatively exhibit a degree of liquid crystallinity ($\Delta H_{lc}$) of at least or above 10, 11, 12, 13, 14, 15, 16, 17, 18, 19, or 20 J/g, or a $\Delta H_{lc}$ within a range bounded by any two of the foregoing values. The $\Delta H_{lc}$ is the enthalpy change involved in the LC phase transition. In the LCEs discussed herein, $\Delta H_{lc}$ can be used to estimate the degree of liquid crystallinity of the material because only one LC phase transition, smectic-isotropic, is involved in the LCEs. The degree of liquid crystallinity strongly affects shape memory behavior of the LCEs as both shape-programming and shape-recovering are realized because of the rotation of LC domains in the LCEs. In addition, since liquid crystals are generally rigid-rod molecules, they can be regarded as reinforcing fillers in the materials, which has great influence on mechanical properties of the LCEs. Being able to control liquid crystallinity provides a unique way to tailor thermo-mechanical properties of the LCEs, which in turn affect shape memory behavior of the LCEs.

The LCEs considered herein preferably additionally or alternatively exhibit a storage modulus (E') of up to or less than 1.5, 2, 2.5, 3, or 3.5 MPa at 150° C. or a storage modulus of 1, 1.5, 2, 2.5, or 3 GPa, or within a range therein, at a temperature of −50° C. The E' determines the strength of a material. Shape memory materials with high strength are favored in some applications, such as self-assembling devices that can change shape under load.

The LCEs considered herein may also possess a low coefficient of thermal expansion (CTE). The rigid LC domains in the LCEs restrict motion of polymer chain segments, thereby reducing CTE of the materials. In addition, controlling orientation of the LC domains using external fields provides another way to tailor thermal expansion of the material.

In particular embodiments, the LCEs having the above-described properties are produced by crosslinking aromatic epoxy (i.e., epoxidized) molecules with alkylene diacid molecules. The carboxylic acid functional groups in the alkylene diacid molecules react by known mechanisms with the epoxy groups in the aromatic epoxy molecules. Once crosslinked, the LCEs possess aromatic epoxy units crosslinked with alkylene diacid units. The initial crosslinking reaction involves ring-opening of the epoxy groups along with esterification to form hydroxy groups on the growing polymer. The newly generated hydroxy groups, in turn, react with the aromatic epoxy molecules via further ring opening of epoxy groups and further production of hydroxy groups, which, in turn, can further react with additional epoxy groups or carboxylic acid groups. The growing number of hydroxy groups also further react with the alkylene diacid molecules via esterification. Thus, the crosslinking reaction is quite complex, with an array of various crosslinking reactions. The predominance of one or more types of crosslinking reactions over other crosslinking reactions will substantially determine the properties in the final LCE.

A generalized depiction of the initial crosslinking process is provided as follows:

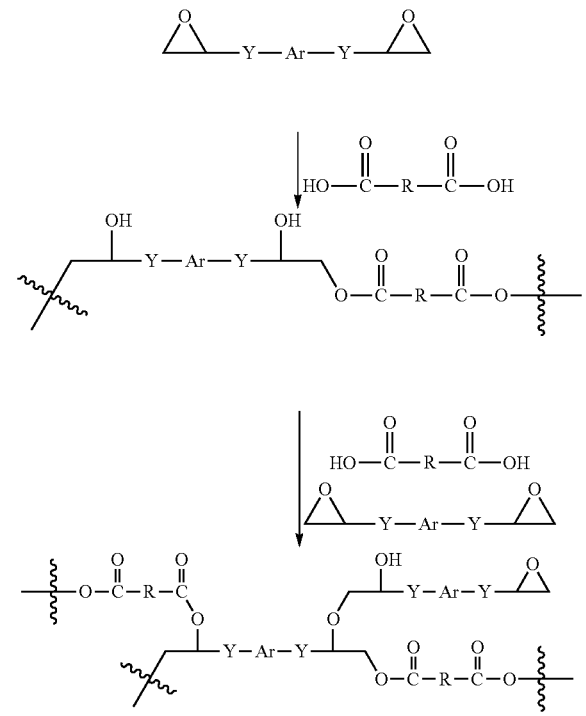

The wavy lines in the above scheme indicate interconnection with other bonds denoted with the wavy line. The aromatic epoxy molecules are depicted in the above scheme as containing a central aromatic portion Ar. The term "aromatic portion" refers to at least one aromatic ring, wherein the aromatic ring may be carbocyclic (i.e., without ring heteroatoms, such as benzene or naphthalene) or heteroaromatic (i.e., with ring heteroatoms, such as pyridine). The aromatic portion Ar may include precisely or at least one, two, three, four, or more aromatic rings. In the case of two or more aromatic rings, the rings may be linked by a covalent bond (e.g., biphenyl) or may be fused (e.g., naphthalene or anthracene). In some cases, the rings may be fused and also include a covalent bond, as in the case of two naphthalene ring systems connected by a covalent bond. The Y groups in the aromatic epoxy molecules independently represent covalent bonds or a linking group, such as a —OCH$_2$— group, in which case the epoxy group is bound to the Ar group as a glycidyl group. The Y groups are often the same, but may be different in some embodiments. The Y groups may also be alkylene linkers, such as methylene (—CH$_2$—), dimethylene (—CH$_2$CH$_2$—), and trimethylene (—CH$_2$CH$_2$CH$_2$—) linkers.
Some examples of aromatic epoxy molecules include:
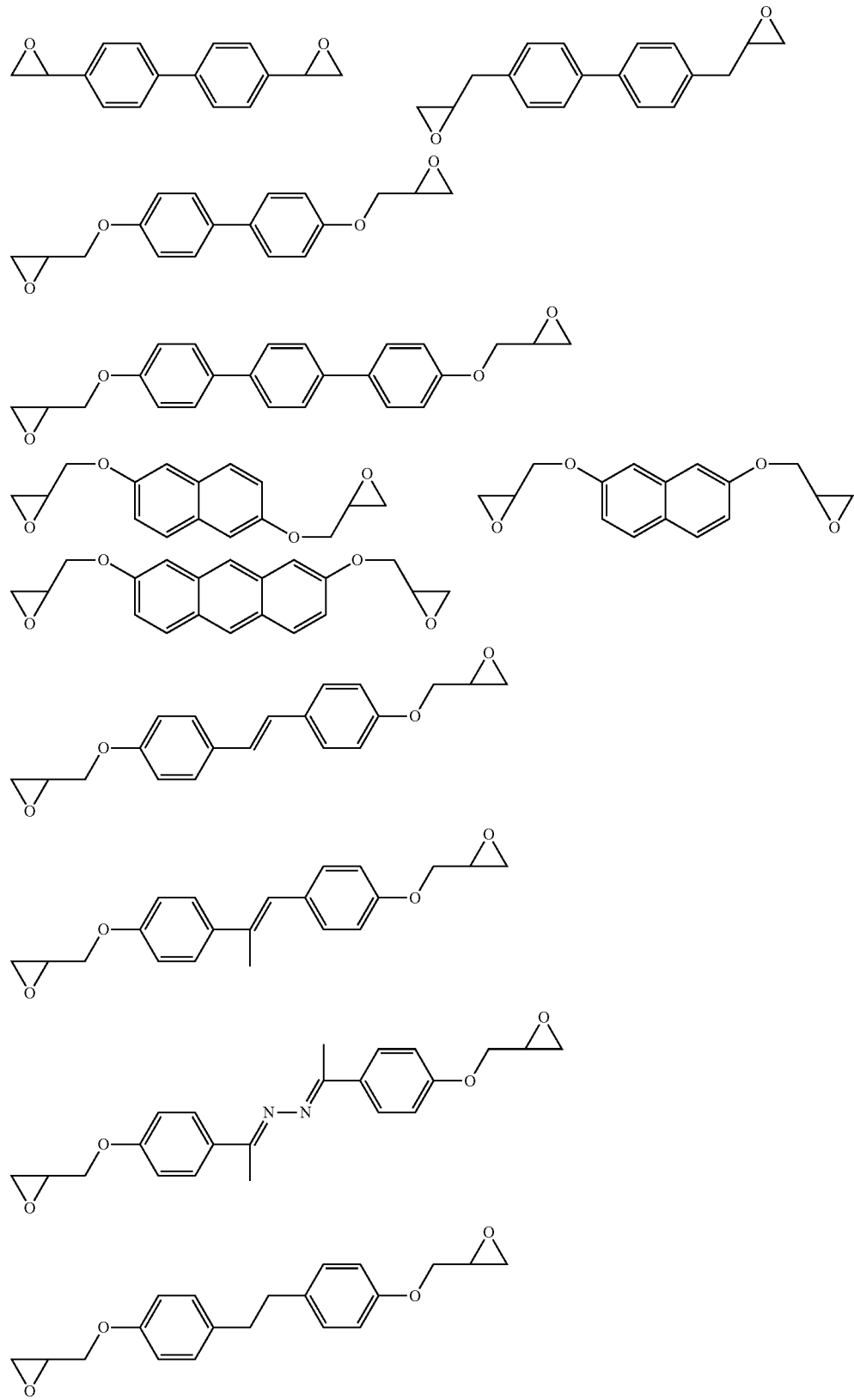

-continued

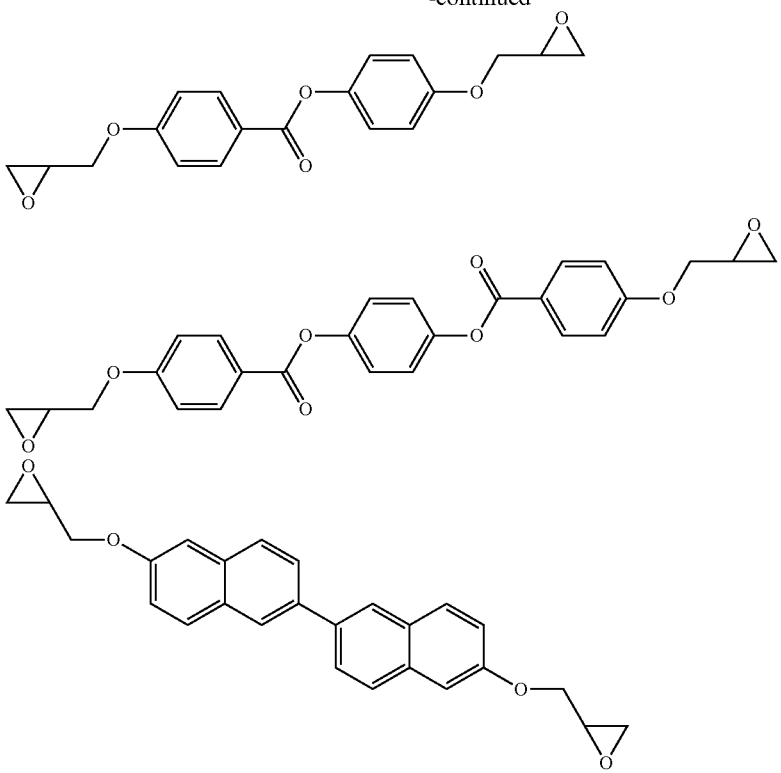

The alkylene diacid molecules possess an alkylene segment containing at least two methylene units along with two carboxylic acid groups as substituents. The alkylene diacid molecule can be conveniently expressed by the following formula:

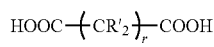

wherein r is at least 1 to provide for the at least one methylene group —CR'$_2$—. The variable r may be, for example, precisely, at least, or above 1, 2, 3, 4, 5, 6, 7, 8, 9, 10, 11, or 12, or within a range bounded by any two of the foregoing values (e.g., at least 4, 5, 6, or 7 and up to 8, 9, 10, 11, or 12). The R' groups are generally independently selected from H and alkyl and/or alkenyl groups containing 1, 2, or 3 carbon atoms. The term "independently," used above, indicates that R' groups are independently selected within the same methylene group and over different methylene groups. In some embodiments, the R' groups are solely hydrogen atoms, or alternatively, the diacid may include at least one or two methylene groups in which the R' groups are hydrogen atoms. Some examples of alkylene diacid molecules having R' solely as hydrogen atoms include malonic acid, succinic acid, glutaric acid, adipic acid, pimelic acid, suberic acid, azelaic acid, sebacic acid, undecanedioic acid, dodecanedioic acid, tridecanedioic acid, and tetradecanedioic acid. Some examples of alkylene diacid molecules having at least one R' as an alkyl group include 2-methylsuccinic acid, 2,3-dimethylsuccinic acid, and 2-ethyl-2-methylsuccinic acid. In some embodiments, at least one R' group may be a hydroxy group, such as in hydroxybutanedioic acid. In other embodiments, aside from at least one methylene group, the alkylene diacid may include at least one oxo group (C=O), such as in oxobutanedioic acid or oxoglutaric acid. In yet other embodiments, R' groups from adjacent methylene groups may combine as a double bond, such as in fumaric acid, maleic acid, glutaconic acid (pent-2-enedioic acid), traumatic acid (dodec-2-enedioic acid), muconic acid (hexa-2,4-dienedioic acid), citraconic acid (2-methylbut-2-enedioic acid), and mesaconic acid (2-methyl-2-butenedioic acid).

The appropriate conditions under which the aromatic epoxy molecules can be made to crosslink with the alkylene diacid molecules are well known in the art. Typically, an amount of the epoxy molecules and alkylene diacid molecules are rendered in liquid form, either by melting or dissolution in an inert solvent, combined, poured into a mold, and cured at a suitably elevated processing temperature, e.g., 120° C.-250° C., for a suitable amount of time (e.g., 2-12 hours, depending on the temperature) for the curing step to be completed. In different embodiments, the processing temperature may be at least, above, up to, or less than, for example, 120° C., 130° C., 140° C., 150° C., 160° C., 170° C., 180° C., 190° C., 200° C., 210° C., 220° C., 230° C., 240° C., or 250° C., or a processing temperature within a range bounded by any two of the foregoing values.

Any suitable molar ratio of epoxy molecules to alkylene diacid molecules may be used. However, for purposes of the invention, the molar ratio used preferably results in an LCE composition having any one or more of the properties described above, particularly in the $T_g$, $T_{lc}$, $\Delta H_{lc}$, and E' characteristics, as described above. In different embodiments, and depending on the type of epoxy molecule and alkylene diacid and other conditions, the molar ratio of epoxy molecules to alkylene diacid molecules may be precisely, at least, above, up to, or less than, for example, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2.0, or the molar ratio may be within a range bounded by any two of the foregoing values. In particular embodiments, the molar ratio is at least or above 0.3, 0.4, 0.5, 0.6, or 0.7 and up to or less than 0.8, 0.9, 1, 1.1, 1.2, or 1.5.

In other embodiments, the liquid crystalline elastomer composition includes aromatic epoxy units crosslinked with a polyphenolic substance having at least four, five, or six phenolic groups, such as a lignin. Other polyphenolic substances include tannin (e.g., tannic acid), tannin derivatives (e.g., ellagotannins and gallotannins), phenol-containing polymers (e.g., poly-(4-hydroxystyrene)), phenol-formaldehyde resoles or novolak resins containing at least four phenol groups (e.g., at least 4, 5, or 6 phenol groups), quercetin, ellagic acid, and tetraphenol ethane.

The epoxy-polyphenol compositions can be prepared by crosslinking aromatic epoxy molecules, such as any of the aromatic epoxy molecules provided above, with polyphenolic molecules in a molar ratio that results in properties suitable for use in an additive manufacturing processes, such as any of the properties discussed above, including the $T_g$, $T_{lc}$, or $\Delta H_{lc}$ properties described above. Generally, the molar ratios between the phenol groups, epoxy groups, and optional curing agent (e.g., polyamine or diacid) groups are selected so that the resulting liquid crystalline elastomer composition has a $T_g$ that does not exceed the $T_g$ of the lignin. If an optional curing agent is included, the curing temperature generally decreases. If the proportion of epoxy is increased, this should also increase the strength of the cured lignin composite material. The molar ratio can be, for example, a phenol to epoxy molar ratio that corresponds to any of the molar ratios or ranges provided above. In preferred embodiments, phenol groups and epoxy groups are in a molar ratio of 3:2 to 1:2. In different embodiments, phenol groups and epoxy groups are in a molar ratio of 3:2, 2.75:2, 2.5:2, 2.25:2, 1:1, 1:1.25, 1:1.5, 1:1.75, or 1:2, or a molar ratio within a range bound by any two of the foregoing ratios. The process for preparing the epoxy-polyphenol composition may also employ any of the processing temperatures provided above, or alternatively, a lower processing temperature of up to or less than 60° C., 70° C., 80° C., 90° C., 100° C., 110° C., or 120° C. In some embodiments, the epoxy-polyphenol composition further includes alkylene diacid units, as discussed above. Thus, stated differently, the epoxy-diacid system described earlier in this application may also include a polyphenolic substance as a further crosslinking agent, wherein the polyphenol may replace a portion (e.g., 10%, 20%, 30%, 40%, 50%, 60%, 70%, 80%, or 90%, or range therein) of the alkylene diacid.

The lignin can be any of the types of lignins known in the art. As known in the art, the compositions of lignins are generally highly variable and not well defined, although the lignins may be classified according to certain broad types, as further discussed below. The lignin may be, for example, a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins.

The lignin may also be substantially soluble in a polar organic solvent or aqueous alkaline solution. Thus, the lignin may have sufficient solubility to produce at least a 5 wt %, 10 wt %, 15 wt %, 20 wt %, 30 wt %, 40 wt %, or 50 wt % solution in the polar organic solvent or aqueous alkaline solution. In different embodiments, the lignin component has a molecular weight of about, at least, above, up to, or less than, for example, 1,000 g/mol, 5,000 g/mol, 10,000 g/mol, 15,000 g/mol, 20,000 g/mol, 30,000 g/mol, 40,000 g/mol, 50,000 g/mol, 60,000 g/mol, 70,000 g/mol, 80,000 g/mol, 90,000 g/mol, 100,000 g/mol, 120,000 g/mol, 150,000 g/mol, 180,000 g/mol, or 200,000 g/mol, or a molecular weight within a range bounded by any two of the foregoing exemplary values. The lignin may also be a crosslinked lignin, such as produced by crosslinking a lignin precursor with formaldehyde, glyoxal, or epichlorohydrin (e.g., U.S. Pat. No. 4,244,728). Any one or more of the foregoing types of lignins may be used (or excluded) in the method described herein. The lignin may also be a softwood or hardwood lignin, as well known in the art.

Fourier transform ion cyclotron resonance mass spectrometry (FT-ICR MS) is an ultrahigh resolution mass spectrometry technique that enables the characterization of complex natural biopolymers (Chatterjee, S. et al., *ACS Sustainable Chemistry & Engineering* 2(8), 2002-2010, 2014). FT-ICR MS can be used to characterize the chemical composition of lignins, such as Alcell hardwood lignin (AHL) and Kraft softwood lignin (KSL). The mass spectra for AHL and KSL reveals a total of ~9000 and ~7000 distinct peaks, respectively. Due to the high mass resolution of FT-ICR MS, each peak can be accurately assigned to a specific elemental composition, followed by binning of the data into heteroatom classes. Van Krevelen diagrams express the sample composition in terms of molar ratios of hydrogen to carbon (H:C) versus the molar ratio of oxygen to carbon (O:C). Oxygen is found almost exclusively in methoxy-substitutions and aliphatic and phenolic hydroxyl functional groups, the latter of which are essential for crosslinking with the epoxy. Thus the amount of functional groups available for crosslinking can be derived from the O:C ratio. Typical O:C ratios in samples of both AHL and KSL range from 0.15-0.49 (average 0.32). For example, AHL generally contains 3.7-3.9 mmol/g phenolic hydroxyls (~6 mmol/g total) (C. A. Cateto, et al., *J. Appl. Polym. Sci.*, 109(5), 3008-3017, 2008), while a typical epoxy monomer diglycidyl ether formulation contains ~6 mmol/g reactive epoxide groups. Thus, in proportion to compositions using diacids as a curing agent, lignin-epoxy compositions corresponding to molar ratios of the respective functional groups between 3:2 and 1:2 should result in optimal crosslinking between the epoxy resin and the biopolymer. If one or more other curing agents (i.e. polyamines, diacids) are included, the proportion of epoxy can be increased proportionally.

In another aspect, the invention is directed to methods of additive manufacturing in which any of the above-described liquid crystalline elastomer compositions is fed into an additive manufacturing device to produce an object made of the liquid crystalline elastomer composition. In the additive manufacturing process, any of the above-described liquid crystalline elastomer compositions, which may be in fiber or pellet form (i.e., as an extrudate), is used as a feed material in an additive processing device to produce an object made of the liquid crystalline elastomer. The additive manufacturing process can be any of the additive processes well known in the art, particularly a rapid prototyping unit, such as a fused deposition modeling (FDM). or equivalently, a fused filament fabrication (FFF) device, or more particularly, a 3D printer. As well known in the art, the additive process (particularly FDM or 3D printing process) generally operates by hot extruding a precursor (in this case, the liquid crystalline elastomer) through a die or nozzle of suitable shape, and repeatedly depositing discrete amounts (e.g., beads) of the precursor in designated locations to build a structure. The temperature employed in the additive process is generally a temperature at which the precursor is extrudable but not in a completely melted state, i.e., a temperature below the melting temperature of the polymer. Upon exiting the die (i.e., nozzle) in the additive processing unit, the precursor material cools and solidifies. In the FDM or 3D printing process, the nozzle is moved in precise horizontal and vertical positions as beads of the precursor are deposited. In this way, the additive process can build an object layer by layer using the feed material. The nozzle movements and flow rate are generally controlled by computer software, typically a computer-aided manufacturing (CAM) software package. The FDM or 3D printer builds an object (article) based on instructions provided by a computer program that includes precise specifications of the object to be constructed. The object can have any suitable shape or function, such as, for example, an intelligent implant, where a complex structure is 3D-printed and compressed to a smaller object. After implantation, an external stimuli can be applied to trigger the shape memory behavior so that the object can return to the complex/functional structure. The object may also be, for example, a toy having a complex structure, which may return to an original shape after exposure to a suitable stimulus. By virtue of a shape memory behavior of the object, the object may be flattened for easy transportation and later converted to its intended shape on delivery and exposure to a suitable stimulus. The shape memory aspect of the object may permit the object to be re-assembled. The 3D printing process can incorporate a high degree of complexity, while the shape memory behavior can simplify the structure.

In some embodiments, particularly as part of an additive manufacturing process, the chemical bonding across layers can be obtained and/or enhanced by applying a directional electromagnetic field to the deposited material. In these embodiments, the method controls the crystalline domains of the polymer materials using directional electromagnetic fields to create strong covalent bonding between and/or across layers.

Desirably, the directional electromagnetic field is applied to the deposited material before or during cross-linking, such as after partial or full deposition of the material. The material is desirably an aromatic-containing material, such as any of the liquid crystalline elastomeric materials described above, and having a low coefficient of thermal expansion (CTE). For example, in one embodiment, a magnetic field directed perpendicular to the plane of an aromatic system induces a ring current in the delocalized pi-electrons of the polymer. The ring current results in reorientation of the aromatic system parallel to the magnetic field. In this way, it is possible to align and cure aromatic epoxy compounds in an oriented nematic or smectic phase by applying a static magnetic field. Notably, the liquid crystalline epoxies cured under a high magnetic field can exhibit a slightly negative glassy CTE. These bulk properties are directly related to the long-range ordering of crystalline domains, essentially forming a texture that aligns with the magnetic field lines.

Examples have been set forth below for the purpose of illustration and to describe certain specific embodiments of the invention. However, the scope of this invention is not to be in any way limited by the examples set forth herein.

EXAMPLES

Overview of Experiments

The present application describes, in particular, the preparation of a smectic main-chain liquid crystalline elastomer (LCE) by polymerization of a biphenyl-based epoxy monomer with an aliphatic dicarboxylic curing agent. By adjusting the stoichiometric ratio of the monomer to the curing agent, liquid crystallinity, crosslink density, and network rigidity of the LCEs were carefully controlled, thereby providing an easy way of tailoring LC and thermomechanical properties of the material. The prepared LCEs exhibited significant differences in phase transition temperatures, stress-strain behaviors, dynamic mechanical properties, shape memory behaviors, thermomechanical properties, and thermal degradation behaviors due to the tailored microstructure.

The following experiments describe methods to prepare smectic main-chain liquid crystalline epoxy elastomers. A new class of materials are described based on epoxy and elastomer composites. Microstructures of the material, including liquid crystallinity and crosslinking network, were modified by adjusting the stoichiometric ratio of the reactants to tailor thermomechanical properties and shape memory behaviors. These materials are particularly suited for additive manufacturing of materials with enhanced cross-layer bonding and functionality, such as shape-shifting structures. Additive manufacturing of mechanically robust polymer composites requires localized heating and large thermal gradients that cause many conventional materials designed for polymer additive manufacturing to fail due to large macroscopic distortions. This problem is compounded by low adhesion between deposition layers. A particular strategy for overcoming this problem focuses on controlling the evolution of crystalline domains using directional electromagnetic fields and strong covalent bonding across layers.

Materials with low coefficient of thermal expansion (CTE) can be obtained from liquid crystalline precursors. The zero-CTE epoxy composite and a shape-shifting liquid crystalline elastomeric composite disclosed herein are compatible with additive manufacturing. The economic viability of the process can be maintained by making use of low-cost biopolymers (e.g., lignin) both as integral component and/or cross-linking agent. The following experiments are based on a two-phase approach: 1. Conversion of a commercial epoxy into stable pellets for room temperature extrusion. Electromagnetic processing provides the targeted deposition of power and thermal energy to control polymer morphology resulting in a benchmark zero-CTE epoxy resin. 2. Incorporation of lignin as a rigid crosslinker and compounding with other reinforcing agents, such as glass fibers, lower cost and improve the strength and durability of the material.

Preparation of Liquid Crystalline Elastomers

The epoxy monomer, in this case, 4,4'-diglycidyloxybiphenyl (BP), was placed in a beaker and heated in an oil bath. After the epoxy monomer was completely melted, the curing agent, in this case, sebacic acid (SA), and a catalyst (1,3,5-triazabicyclodec-5-ene) were introduced, followed by vigorous stirring for approximately 1 minute. The mixture was poured into a PTFE mold and cured in a convection oven at 170° C. for 6 hours. The molar ratio of BP to SA was adjusted to prepare LCEs with different microstructures. Three ratios (0.5, 0.7, and 1.0) were used and the resulting LCEs were referred to as BP-SA-05, BP-SA-07, and BP-SA-10, respectively. Note: the LCEs may be prepared without the catalyst, but the catalyst was included in the above experiment in an effort to incorporate some dynamic ester bonds so that the LCEs could be reprocessed.

Characterization of the Liquid Crystalline Elastomers

The presence of crosslinked LC domains and their reversible phase transitions upon heating and cooling are crucial for the shape memory behavior of LCEs. Therefore, thermal and LC properties of the synthesized LCEs were investigated using differential scanning calorimetry (DSC). As shown by the heat flow vs. temperature graphs in FIG. 1a, the three LCEs exhibited different $T_g$ and $T_{lc}$ values, which indicates that the formation of the LC domains and the structure of the crosslinking network were strongly affected by the chemistry between the monomer and the curing agent.

Figure 2:
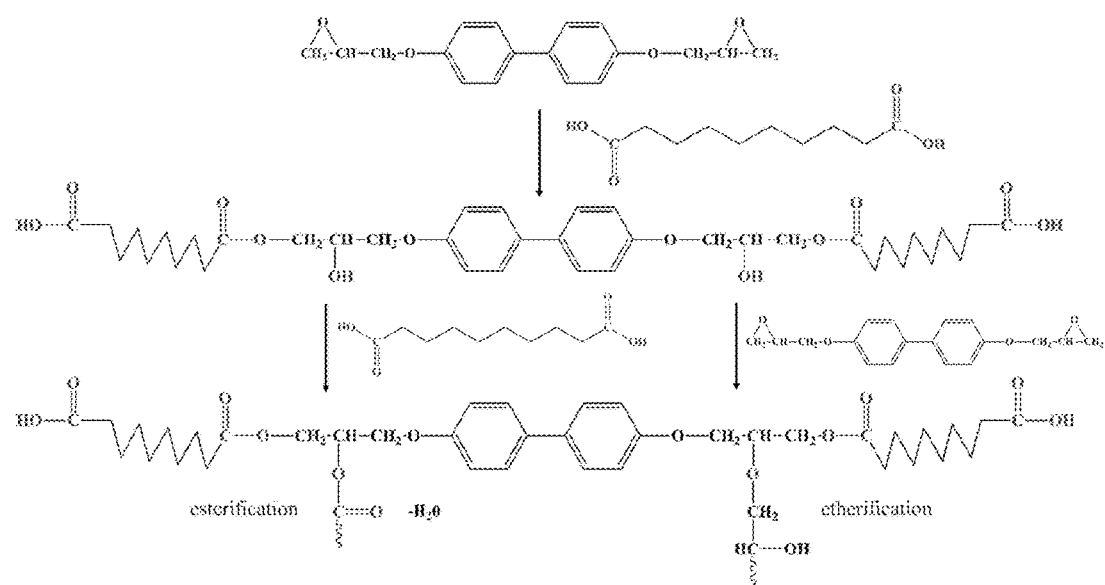
FIG. 2. Schematic showing some of the possible chemical reactions between an epoxy monomer and a diacid curing agent.

The reaction between epoxy and carboxylic acid is complicated and involves several parallel reactions, as depicted in FIG. 2. The first step involves the ring-opening reaction of the epoxy by the carboxylic acid, resulting in the formation of a linear oligomer with carboxylic acid groups on the end as further reaction sites. This step may be crucial for the LC phase formation since the aspect ratio of the BP mesogen may not be high enough to exhibit LC behaviors. The addition of SA increases the mobility of BP by introducing aliphatic chains onto the monomers, facilitating their self-organization into an ordered LC phase. The second step involves the crosslinking of hydroxyl groups formed in the previous step by reaction with carboxylic acid groups by an esterification reaction or reaction with epoxy groups by an etherification reaction. The chemical bond formation in this step is believed to be highly dependent on the stoichiometric ratio of BP to SA, and thus, the molar ratio is expected to significantly influence the liquid crystallinity and network structure of the LCEs.

Figure 3A:
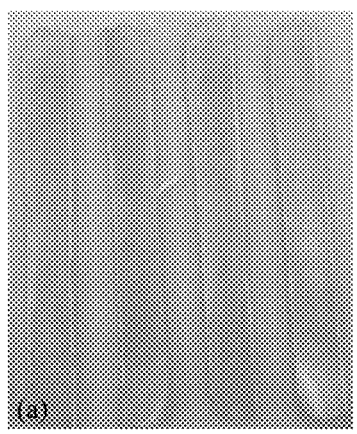
FIGS. 3a-3c. Photos of (a) BP-SA-05, (b) BP-SA-07, and (c) BP-SA-10 liquid crystalline elastomers. Increasing liquid crystallinity is evidenced by a decreasing level of transparency, wherein BP-SA-05 (with largest amount of SA) shows the greatest transparency and least amount of liquid crystallinity.
Figure 3B:
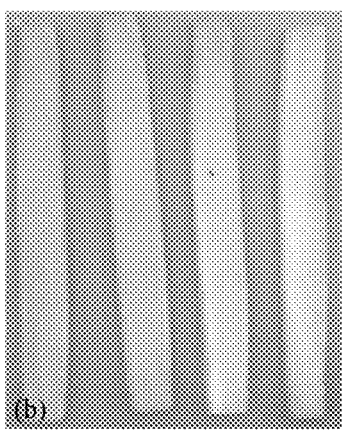
Figure 3C:
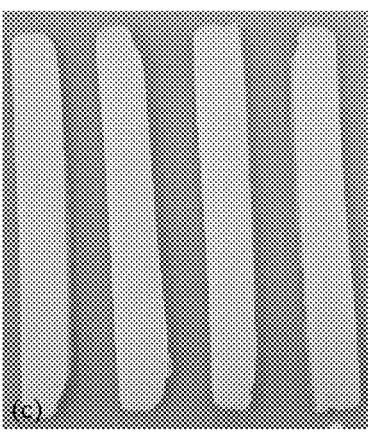

The values of $T_g$, $T_{lc}$, and $\Delta H_{lc}$ determined from DSC and DMA are listed in Table 1 below. The degree of liquid crystallinity (related to $\Delta H_{lc}$) decreased with increasing amount of SA, which indicates that the LC phase formation was highly affected by the crosslinking reaction of the system. In the case of BP-SA-05, due to the abundant supply of SA molecules, the hydroxyl groups formed in the first step reacted immediately to create crosslinks, leading to highly branched oligomer chains that were difficult to be rearranged to form an LC phase. A visual comparison of the LCEs with different composition is provided in FIGS. 3a-3c, in which BP-SA-07 and BP-SA-10 samples appeared more opaque because of their higher degrees of liquid crystallinity, which can result in sufficient light scattering. In contrast, BP-SA-05 appeared more transparent due to the limited number of LC domains in the network. Additionally, small air bubbles were observed on the bottom surface of BP-SA-05, which suggests a higher amount of esterification reaction between hydroxyl groups and carboxylic acid.

TABLE 1

Thermal properties, liquid crystalline behaviors, and dynamic mechanical properties of the LCEs determined by DSC and DMA.

| LCE | $T_g^{a)}$ (° C.) | $T_{lc}^{b)}$ (° C.) | $\Delta H_{lc}$ (J/g) | $T_g^{c)}$ (° C.) | $T_{lc}^{d)}$ (° C.) | E' at −50° C. (GPa) | E' at 150° C. (MPa) |
|---|---|---|---|---|---|---|---|
| BP-SA-05 | 28.83 | 54.91 | 5.61 | 46.13 | 62.80 | 2.38 | 3.94 |
| BP-SA-07 | 43.97 | 92.52 | 14.67 | 53.89 | 84.79 | 2.26 | 2.14 |
| BP-SA-10 | 57.18 | 112.80 | 15.43 | 65.27 | 101.29 | 2.45 | 1.62 |

$^{a)}$Measured from the midpoint of the step change in the second heating DSC scan.
$^{b)}$Measured from the peak of the second heating DSC scan.
$^{c)}$Measured from the first peak of the tan δ curve after peak deconvolution.
$^{d)}$Measured from the second peak of the tan δ curve after peak deconvolution.

As can be seen from Table 1, thermal stability of the LC phase ($T_{lc}$) also exhibited dependence on the stoichiometric ratio. For thermotropic LC polymers, it has been found that thermal stability of the LC phase is closely related to the morphology of the LC lamellae. LC domains with thinner lamellae generally exhibit lower melting temperatures. In the current system, as the amount of the SA molecules increased, the integrity of LC lamellae was adversely affected, leading to LC domains with loosely-packed mesogens and resulting in a lower transition temperature of the LC phase. The glass transition of the LCEs was also influenced by the stoichiometric ratio, as shown in Table 1. The LCEs showed a decrease in $T_g$ as more SA molecules were incorporated into the system, which indicates a softened network.

Figure 1B:
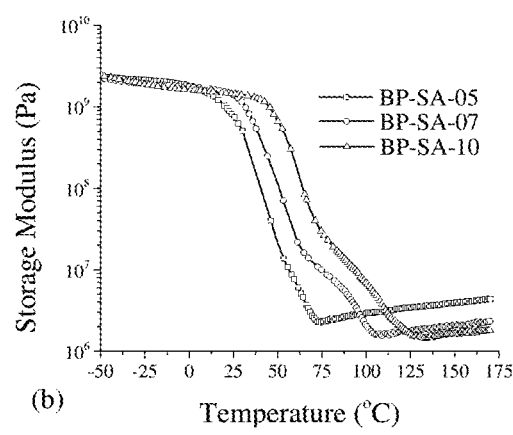
Figure 1C:
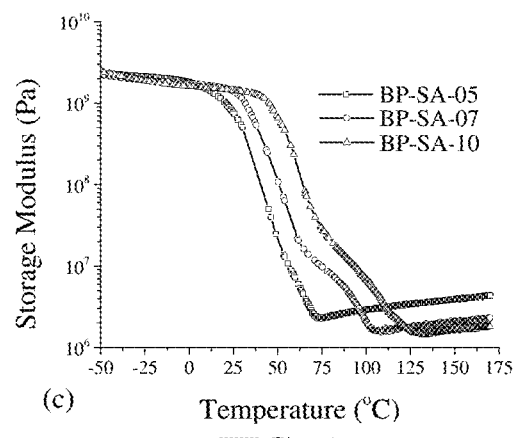

The graphs in FIGS. 1b and 1c show the storage modulus (E') and dissipation factor (tan δ) of the LCEs, as determined by DMA. Two thermal relaxations were observed from the E' and tan δ curves, corresponding to the glass transition and LC-isotropic transition of the LCEs, respectively. The dynamic mechanical data determined from DMA are also summarized in Table 1. Similar to the DSC results, $T_g$ and $T_{lc}$ of the LCEs decreased with increasing amount of SA molecules. Notably, BP-SA-05 exhibited the highest value of E' in the rubbery plateau region, which indicates a higher crosslink density resulting from the higher reaction content of the hydroxyl groups. These differences in LC properties are believed to have a significant influence on shape memory properties of the LCEs, as discussed in the following sections.

Figure 4A:
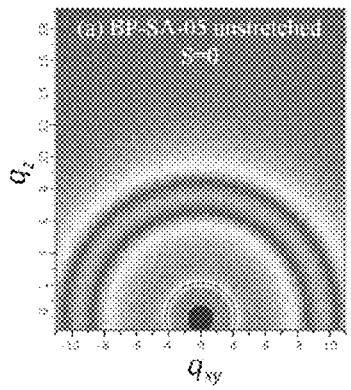
FIGS. 4a-4i. Small angle and wide angle x-ray scattering (SAXS/WAXS) patterns of the LCEs with different composition and degree of orientation, wherein FIGS. 4a-4c correspond to BP-SA-05 at unstretched (S=0), stretched 100%, and stretched 200% modes, respectively.
Figure 4B:
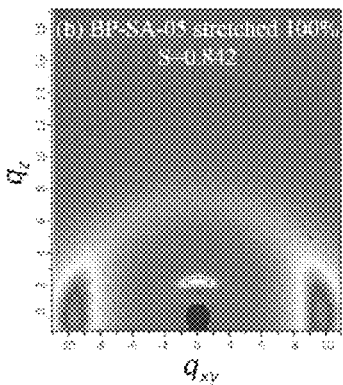
Figure 4C:
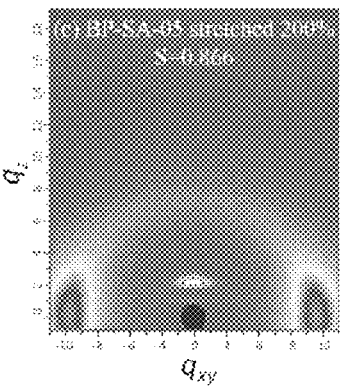
Figure 4D:
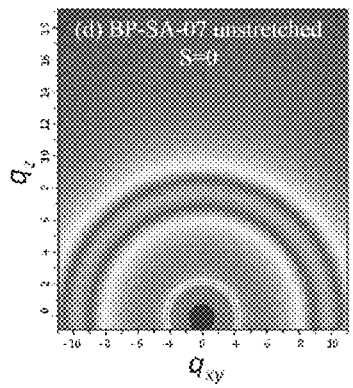
Figure 4E:
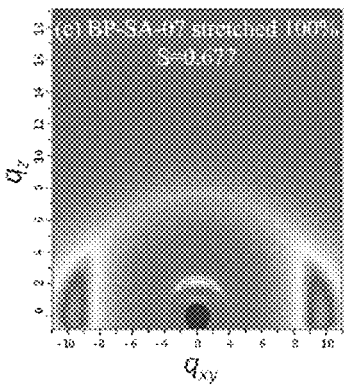
Figure 4F:
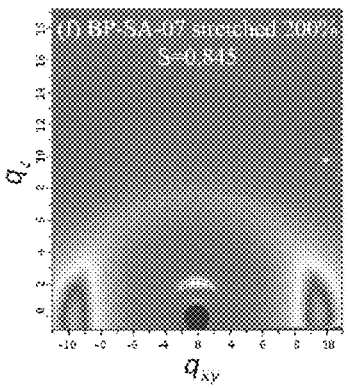
Figure 4G:
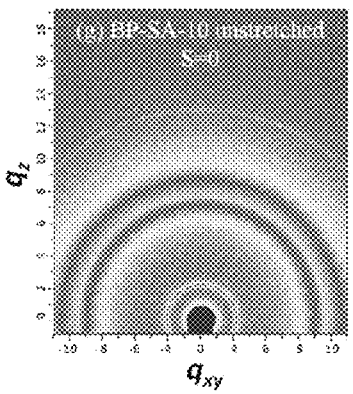
Figure 4H:
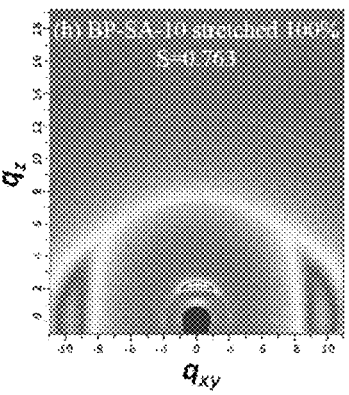
Figure 4I:
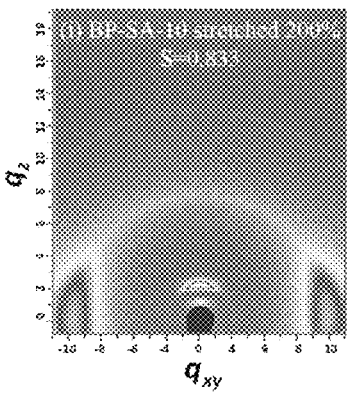
Figure 5A:
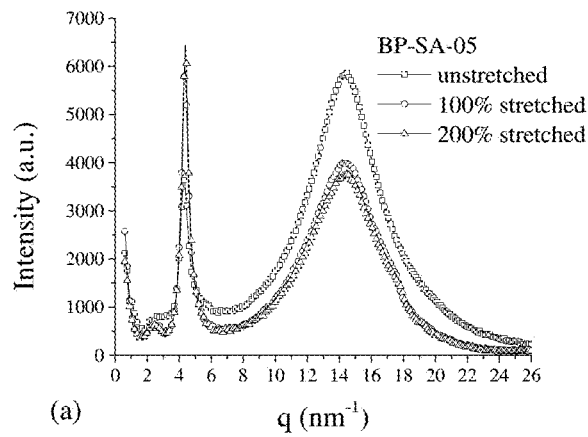
Figure 5B:
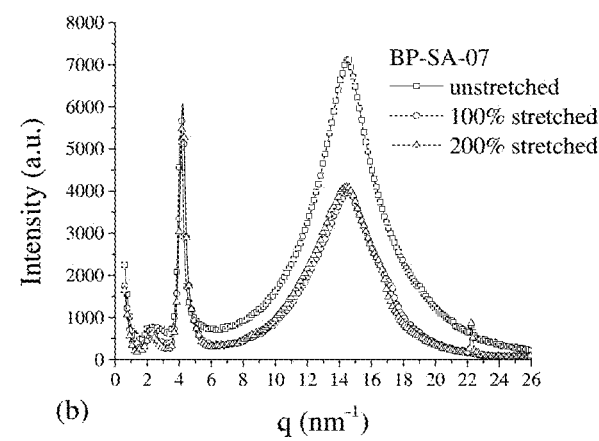
Figure 5C:
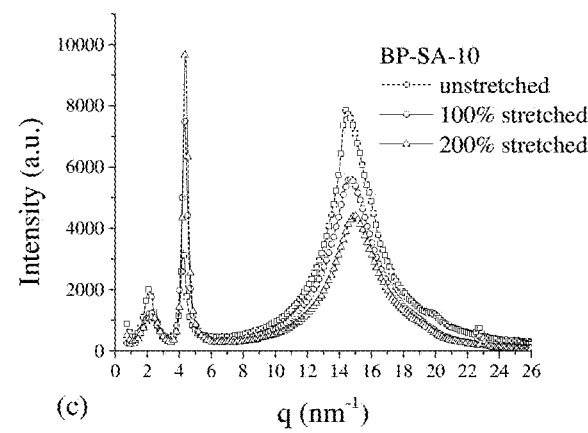

To investigate the macro- and micro-structure of the LCEs, both small-angle x-ray scattering (SAXS) and wide-angle x-ray scattering (WAXS) were used to explore the arrangement of the LC domains in the network and the molecular ordering inside a single LC domain. FIGS. 4a-4i show the two-dimensional X-ray scattering patterns of the LCEs with different composition and degree of orientation. FIGS. 4a-4c show the two-dimensional X-ray scattering patterns of BP-SA-05 for unstretched, stretched 100%, and stretched 200% modes, respectively; FIGS. 4d-4f show the two-dimensional X-ray scattering patterns of BP-SA-07 for unstretched, stretched 100%, and stretched 200% modes, respectively; and FIGS. 4g-4i show the two-dimensional X-ray scattering patterns of BP-SA-10 for unstretched, stretched 100%, and stretched 200% modes, respectively. The patterns were quantified by radial integration along the scattering vectors, and the results are shown in FIGS. 5a-5c for BP-SA-05, BP-SA-07, and BP-SA-10, respectively.

Figure 6:
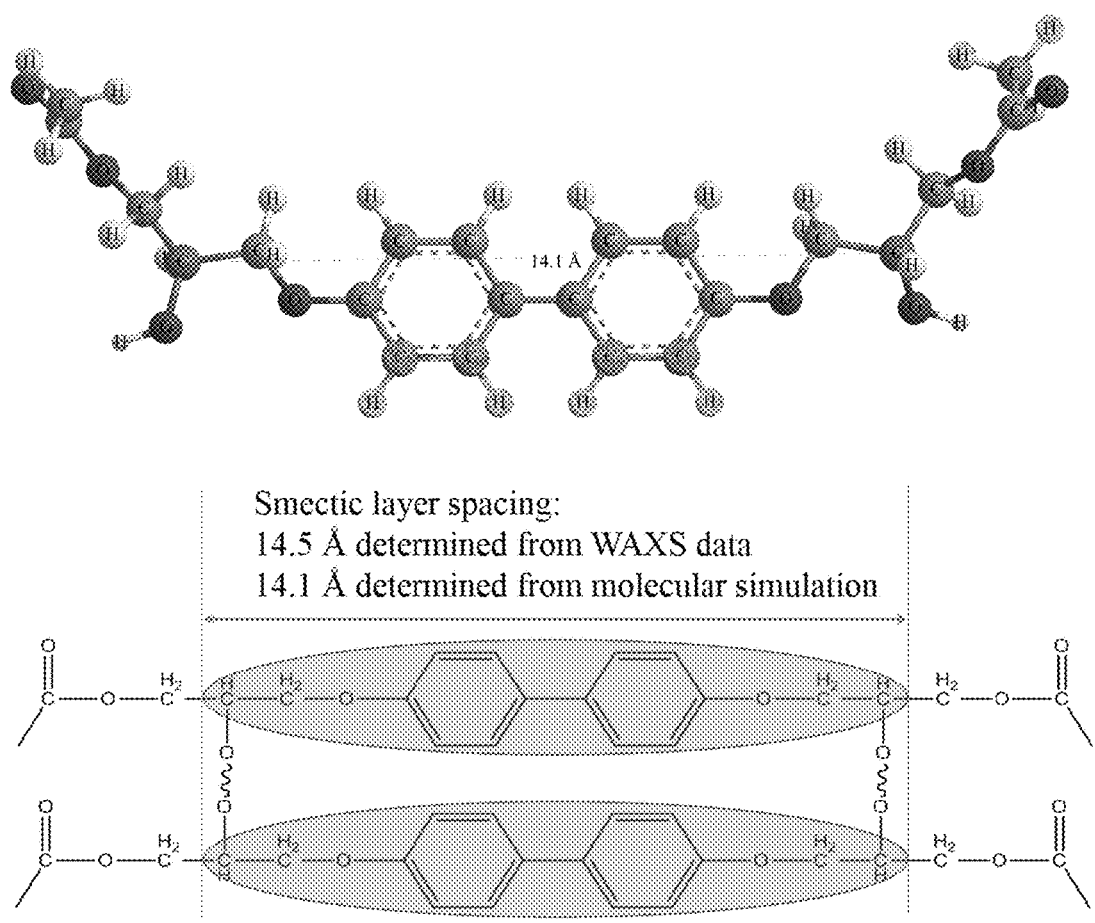
FIG. 6. Molecular simulation of the mesogens and liquid crystalline (LC) phase formation in an epoxy-diacid crosslinked material. The thickness of the smectic layer was influenced by the crosslink points where hydroxyl groups were formed.

As shown in FIGS. 4a, 4d, and 4g, in the case of unstretched LCEs, two major concentric rings were observed, which indicates the presence of a smectic LC phase. The inner sharp scattering ring (q=4.3 nm-1, d=14.5 Å) resulted from the periodic layers of the smectic LC structure with an average layer thickness of 14.1 Å. This value was compared to a molecular simulation of the mesogens performed using ChemBio® 3D software, the results of which are shown in FIG. 6. The results from SAXS and molecular simulation indicated that the crosslinking reaction has a significant influence on the LC phase formation, and the smectic layer thickness was actually controlled by the crosslinking points where hydroxyl groups were formed.

The outer diffuse scattering ring (q=14.8 nm-1, d=4.2 Å) resulted from the scattering of neighboring mesogens in the smectic layers. It also can be seen from FIGS. 4a, 4d, and 4g that all of the LCEs exhibited very similar scattering patterns, which indicates that the structure of the LC domains was not affected by the composition of the LCEs. It is their morphology, such as domain size and number, that could be affected by the composition. For BP-SA-10, an additional scattering ring was observed near the beam stop (q=2.2 nm-1, d=27.8 Å). It was thought that the scattering resulted from the stacking of separated LC domains into an ordered superstructure, and this was affected by the degree of liquid crystallinity of the LCEs, as such scattering was not observed for BP-SA-05 and BP-SA-07 due to their relatively lower degree of liquid crystallinity. In order to probe the morphology of the LC domains, the LCE samples were cryofractured and the cross-sectional areas were examined using SEM. Fracture surfaces of the LCEs with different composition are shown in FIGS. 7a-7f. FIGS. 7a-7c show fracture surfaces of BP-SA-05, BP-SA-07, and BP-SA-10, respectively at 250× magnification, while FIGS. 7d-7f show the same fracture surfaces at 1000× magnification, respectively. As the stoichiometric ratio increased, an increase in roughness of the fracture surface was observed, which indicates a higher number of LC domains in BP-SA-10 since LC domains are known to deviate crack propagation and result in a rough fracture surface. Similar results have also been observed for densely crosslinked liquid crystalline epoxy resins, where a rougher fracture surface was observed for the resin cured into an LC phase compared to that cured into an amorphous phase.

LCEs are known to exhibit large dimensional change due to the macroscopic orientation of the LC domains. In order to correlate the degree of the orientation with mechanical deformation of the LCEs, SAXS/WAXS experiments were performed on samples with different strain values, and the scattering patterns are shown in FIGS. 4a-4i, as discussed above, along with quantified scattering data in FIGS. 5a-5c. The LC domains became highly oriented after the mechanical stretching, as indicated by the scattering arcs with non-uniform intensity distribution. In particular, the inner scattering ring became a pair of scattering arcs in the meridional direction, which indicates that the LC molecules were aligned along the direction of the mechanical stretching and the incident X-rays were perpendicular to the layer normal of the smectic LC domains. A significant increase in scattering intensity resulting from the smectic layers was observed due to the macroscopically oriented LC domains. On the other hand, the laterally packed mesogens after orientation were indicated by a pair of scattering arcs in the equatorial direction. It is noteworthy that the position of the scattering peaks were not affected after the mechanical stretching, which indicates that the elongation of the LCE samples was caused by the rotation of the LC domains instead of their deformation as the smectic layer thickness and mesogen-spacing were not changed.

Figure 8A:
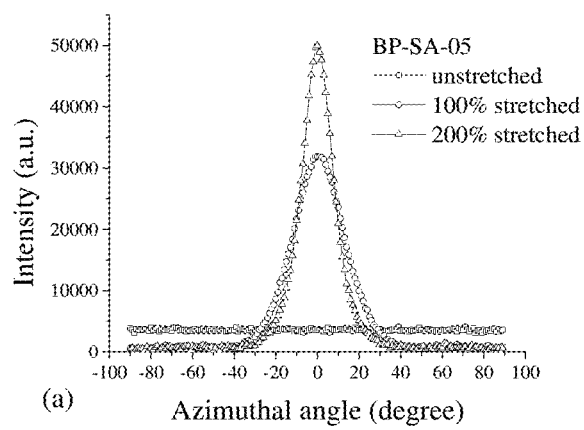
FIGS. 8a-8c. Graphs showing azimuthal intensity distribution of the scattering ring resulting from smectic ordering. The scattering intensity resulting from the smectic layers increased dramatically after the mechanical stretching, which indicates that the LC domains have been macroscopically aligned.
Figure 8B:
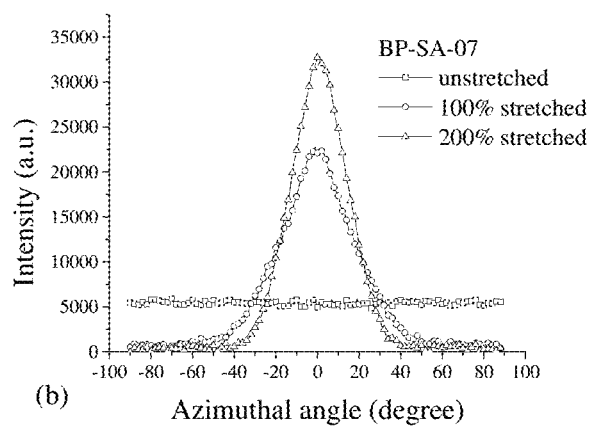
Figure 8C:
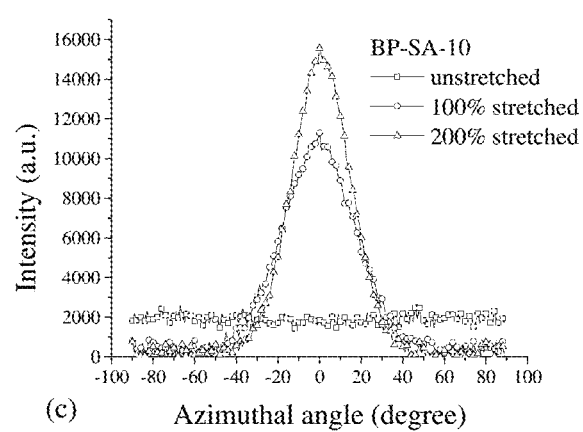

The degree of orientation was evaluated based on the azimuthal intensity distribution of scattering pattern resulting from the layered smectic ordering. FIGS. 8a-8c show the azimuthal intensity distribution of the scattering ring resulting from the smectic ordering for BP-SA-05, BP-SA-07, and BP-SA-10, respectively. An order parameter S was calculated according to Herman's method:

$$\cos(\alpha) = \cos(\chi)\cos(\theta)$$

$$\langle \cos^2 \alpha \rangle = \frac{\int_0^{\pi/2} I(\alpha) \cdot \sin\alpha \cdot \cos^2\alpha \cdot d\alpha}{\int_0^{\pi/2} I(\alpha) \cdot \sin\alpha \cdot d\alpha}$$

$$S = \frac{1}{2}(3\langle \cos^2 \alpha \rangle - 1)$$

where $\alpha$ is the angle between the smectic layer normal and the direction of mechanical stretching, $\chi$ is the azimuthal angle of the scattering ring, and $\theta$ is the scattering angle. $I(\alpha)$ is the intensity distribution of the sample; it can be directly calculated from the azimuthal intensity distribution $I(\chi)$. The calculated order parameters of the LCEs with different composition and degree of orientation are shown in FIGS. 4a-4i with their scattering patterns. All of the LCEs exhibited a significant increase in order parameter after the mechanical stretching. Interestingly, a slight difference in the degree of orientation was observed for the stretched LCEs with different composition. For example, under a deformation of 100%, BP-SA-05 reached a highly ordered state with an order parameter of 0.842, while BP-SA-07 and BP-SA-10 showed a relatively lower degree of orientation. After stretching to a deformation of 200%, a relatively large increase in order parameter was observed for BP-SA-07 and BP-SA-10, compared to that of BP-SA-05. These results indicate that the degree of mechanical deformation and degree of liquid crystallinity of the LCEs are closely related, as the elongation of the samples resulted from the rotation of the LC domains. Thus, LCEs with higher degrees of liquid crystallinity were expected to have higher degrees of mechanical deformation. This was also reflected by the thermomechanical tests, as discussed in the following sections.

Figure 9A:
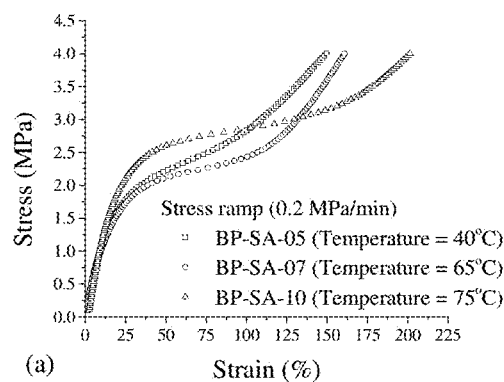
Figure 9B:
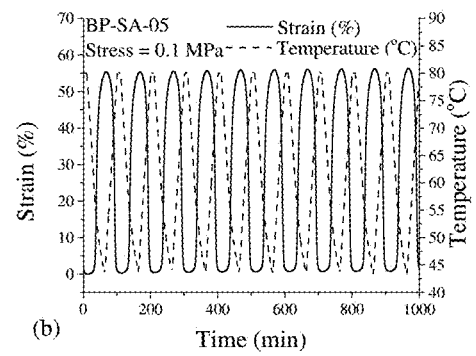
Figure 9C:
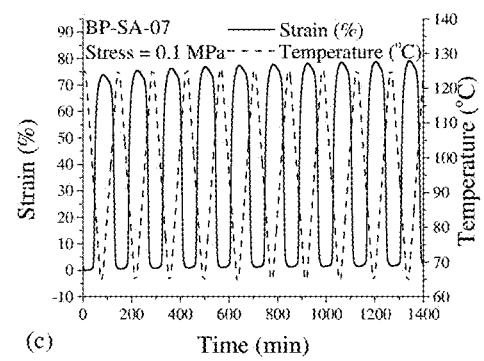
Figure 9D:
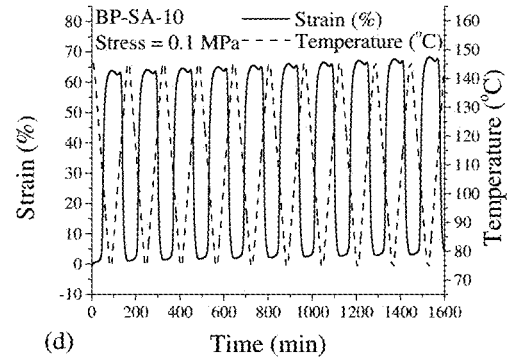

Cyclic thermomechanical tensile tests were employed to study the effects of liquid crystallinity, crosslink density, and network rigidity on the shape memory behaviors of the LCEs. FIG. 9a shows stress-strain curves for BP-SA-05, BP-SA-07, and BP-SA-10 compositions, while FIGS. 9b-9d show the static thermally-activated actuating behaviors of BP-SA-05, BP-SA-07, and BP-SA-10, respectively, under a constant stress of 0.1 MPa. The experiments were conducted at different temperature ranges due to the difference in $T_{ic}$ of the LCEs. In general, the strain of the LCEs increased during the cooling process, which indicates that the smectic LC domains formed upon cooling were immediately aligned. During the heating process, however, the strain decreased, which indicates a contraction of the LCEs caused by the transition of the LC domains from the smectic phase to an isotropic phase. Interestingly, BP-SA-07 exhibited the highest strain value of 75% under the applied stress, compared to the values of 55% and 65% for the BP-SA-05 and BP-SA-10, respectively. This was a combination effect of the liquid crystallinity and crosslink density. In the case of BP-SA-05, the liquid crystallinity was greatly reduced by the crosslinking reaction, and therefore, the LCE was not able to exhibit large dimension change. In contrast, the high ratio of BP to SA resulted in a relatively rigid network of BP-SA-10 and the stress required to achieve the same strain value was increased. In the case of BP-SA-07, the network was softened without sacrificing too much liquid crystallinity and this resulted in the higher strain value observed in the cyclic thermomechanical tensile tests. However, it is worth mentioning that shape memory effect is not only evaluated by the capability of reversible shape change, but also by the repeatability of the actuating behavior. It can be observed from FIG. 9b that although BP-SA-05 exhibited the smallest dimension change, the repeatability of the actuating behavior was improved, which was attributed to the improved network integrity. The permanent deformation after 10 cycles was less than 1% for BP-SA-05, whereas BP-SA-07 and BP-SA-10 showed a permanent deformation of 5% and 4%, respectively. Detailed strain values of the LCEs during each cycle are summarized in Table 2 below.

TABLE 2

Actuating strains of the LCEs determined from the cyclic thermomechanical tensile tests.

| LCE Cycle | BP-SA-05 | BP-SA-07 | BP-SA-10 |
| --- | --- | --- | --- |
| | | Actuating Strain (%) | |
| 1 | 55.3 | 74.8 | 63.8 |
| 2 | 55.3 | 75.5 | 64.2 |
| 3 | 55.5 | 76.3 | 64.6 |
| 4 | 55.7 | 76.9 | 65.1 |
| 5 | 55.9 | 77.4 | 65.6 |
| 6 | 56.0 | 77.8 | 66.1 |
| 7 | 56.1 | 78.2 | 66.6 |
| 8 | 56.2 | 78.5 | 67.2 |
| 9 | 56.2 | 78.9 | 67.7 |
| 10 | 56.2 | 79.1 | 68.3 |

A plateau region was observed from the stress-strain curves for all of the LCEs, which indicates the polydomain-monodomain (P-M) transition of the LC phase. However, due to the difference in liquid crystallinity, the width of the plateau region for the three LCEs was different. BP-SA-10 contained more LC domains that were capable of being aligned, and therefore, exhibited an extended duration of the P-M transition. In addition, compared to the other two LCEs, BP-SA-10 showed the highest critical stress required to induce the P-M transition, which was attributed to the relatively rigid network having high content of biphenyl molecules.

Figure 10A:
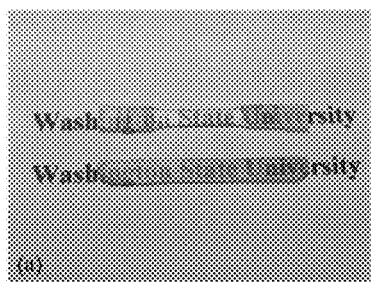
FIGS. 10a-10c. Photos of the BP-SA-05, BP-SA-07, and BP-SA-10 LCEs, respectively, after the static tensile tests.
Figure 10B:
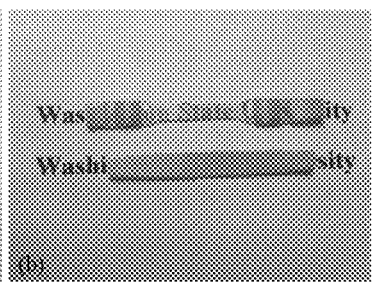
Figure 10C:
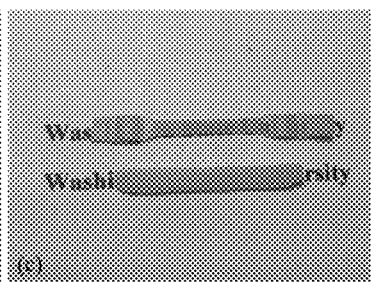

FIGS. 10a-10c are photos of the BP-SA-05, BP-SA-07, and BP-SA-10 LCEs, respectively, after the static tensile tests. The relatively transparent central region of the LCE samples indicate the macroscopic orientation of the LC domains.

Figures 11A, 11B, 11C, 11D, 11E:
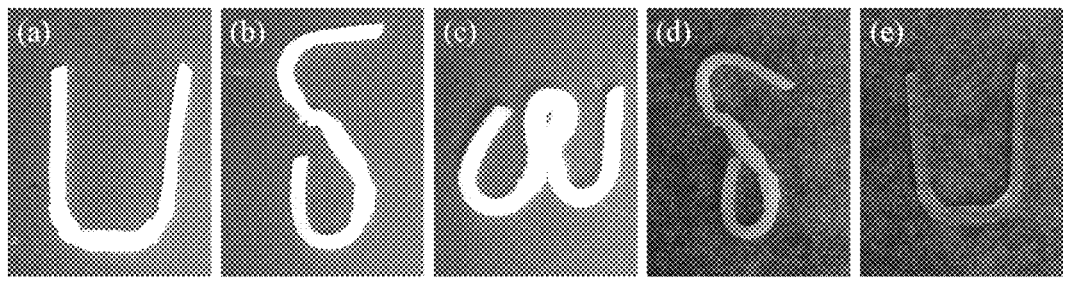
FIGS. 11a-11e. Photos showing triple shape memory behavior of the LCEs.

One of the interesting characteristics of LCEs is their reversible shape change powered by the reversible phase transition of the LC domains. A triple shape memory behavior of the LCEs is demonstrated in FIGS. 11a-11e. FIG. 11a exhibits a permanent shape; FIG. 11b exhibits a deformed to temporary shape 1 at 160° C. and cooled to room temperature; FIG. 11c exhibits a deformed to temporary shape 2 at 85° C. and cooled to room temperature; FIG. 11d exhibits a retrieved temporary shape 1 at 85° C.; and FIG. 11e exhibits a retrieved permanent shape at 160° C.

Figure 12A:
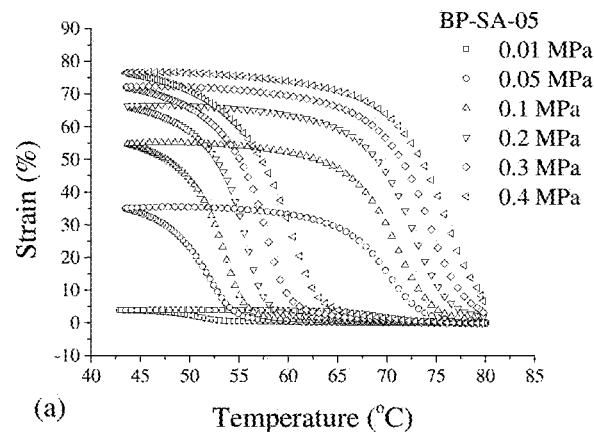
FIGS. 12a-12c. Graph showing cyclic thermomechanical tensile tests of the BP-SA-05, BP-SA-07, and BP-SA-10 LCEs, respectively, at different stress levels of 0.01 MPa to 0.4 MPa.
Figure 12B:
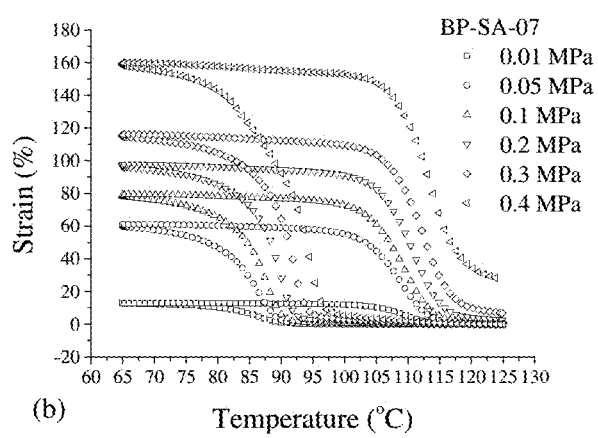
Figure 12C:
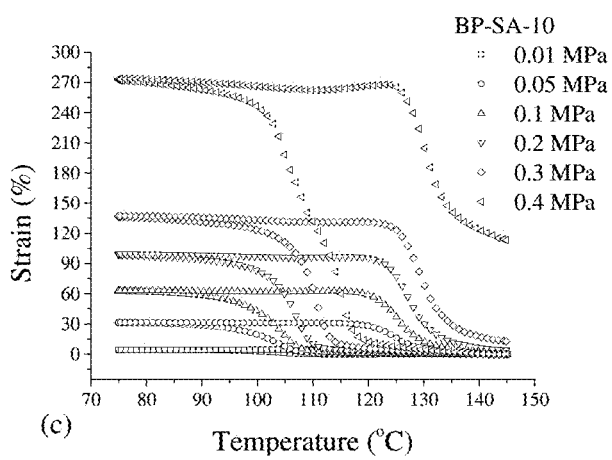

Due to their structural differences, the stress sensitivity of the LCEs was expected to be different. Thus, the cyclic thermomechanical tensile tests were performed at several different stress levels, and the results are shown in FIGS. 12a-12c for BP-SA-05, BP-SA-07, and BP-SA-10, respectively. Again, BP-SA-05 exhibited the best repeatability of the actuating behavior even at the highest stress level (0.4 MPa), where BP-SA-07 and BP-SA-10 both exhibited a large permanent deformation due to the slippage of the polymer chains. However, BP-SA-07 showed the highest sensitivity at lower stress levels (from 0.01 MPa to 0.1 MPa) caused by the balance between liquid crystallinity and network rigidity as mentioned previously. In the case of BP-SA-10, due to its high degree of liquid crystallinity, the LCE sample exhibited the largest dimensional change at higher stress levels (above 0.2 MPa), whereas the shape change of BP-SA-05 and BP-SA-07 was limited by the relatively low number of LC domains that were capable of being oriented. Detailed strain values of the LCEs at each stress level are summarized in Table 3 below.

TABLE 3

Actuating strains of the LCEs determined from the cyclic thermomechanical tensile tests at different stress levels.

| LCE Stress (MPa) | BP-SA-05 | BP-SA-07 | BP-SA-10 |
| --- | --- | --- | --- |
| | | Actuating strain (%) | |
| 0.01 | 3.9 | 12.8 | 4.3 |
| 0.05 | 34.9 | 60.9 | 31.3 |
| 0.1 | 54.8 | 78.7 | 63.2 |
| 0.2 | 66.3 | 96.9 | 99.5 |
| 0.3 | 72.1 | 115.2 | 137.2 |
| 0.4 | 76.4 | 159.8 | 273.6 |

Figure 13A:
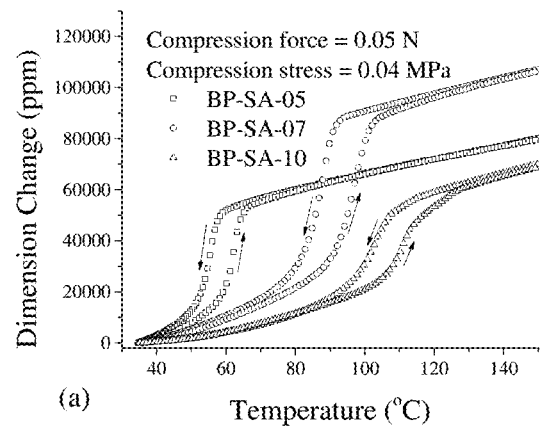
FIGS. 13a, 13b.
Figure 13B:
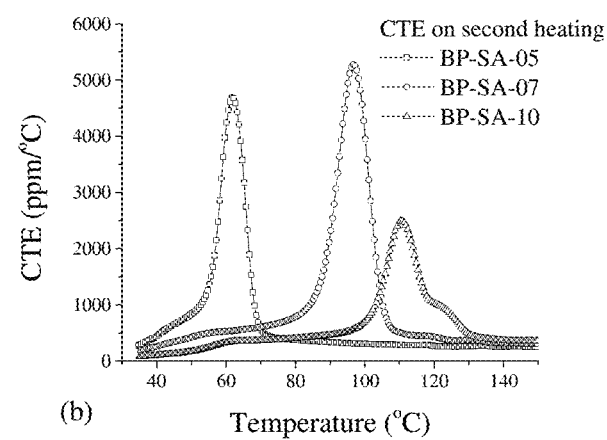

The shape memory behavior of the LCEs was also characterized using cyclic thermomechanical compression tests, and the results are shown in FIG. 13a. All of the LCEs exhibited a reversible shape change, although in this case the LC domains were not aligned in a specific direction, which suggests that the LC domains formed during the cooling process were able to adopt any conformation in response to the external force, and during the heating process, the random conformation can be retrieved due to the entropic force. Additionally, the improved sensitivity of BP-SA-07 to small stress was further confirmed by the larger dimension change. The values of coefficient of thermal expansion (CTE) of the LCEs were determined from the second heating process of the cyclic thermomechanical compression tests, and the results are shown in FIG. 13b. The difference in CTE value provided additional information on the structure difference of the LCEs. For example, BP-SA-10 exhibited the lowest CTE values in the glassy region (below 60° C.), which indicates the relatively rigid characteristic of the material due to the high ratio of rigid biphenyl molecules, which resists dimension change. However, in the rubbery region (above 140° C.), BP-SA-05 exhibited the lowest CTE values because of the high crosslink density, which provides additional support to the network against thermal expansion.

Figure 14A:
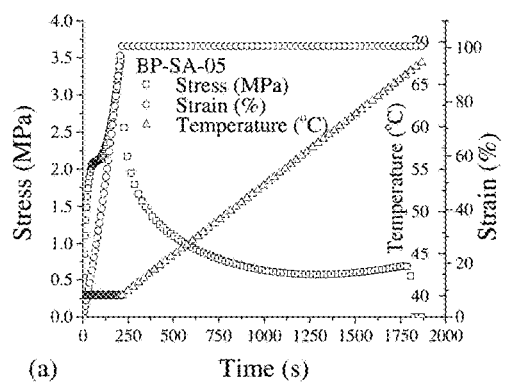
Figure 14B:
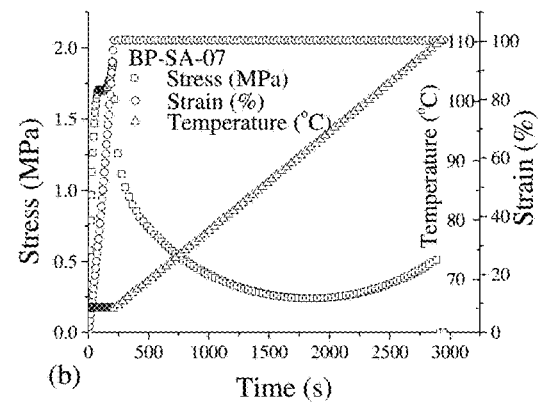
Figure 14C:
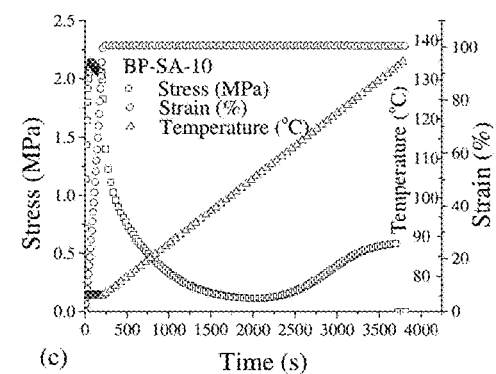
Figure 14D:
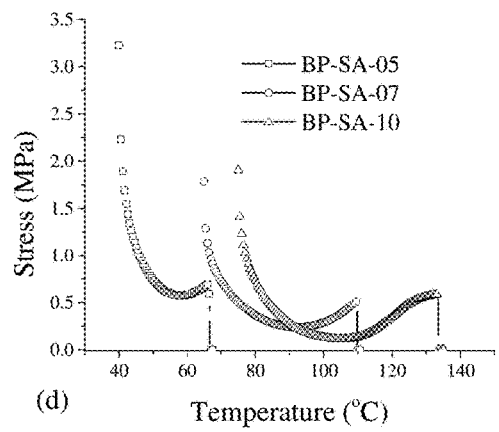

Isostrain tests were conducted to evaluate the retractive force generated by the aligned LCEs when they are heated through the LC-isotropic phase transition. In this experiment, the LCEs samples were stretched to a strain of 100%, and then the stress required to maintain the constant strain was measured as a function of temperature, as shown in the stress/strain vs. time graphs in FIGS. 14a, 14b, and 14c for BP-SA-05, BP-SA-07, and BP-SA-10, respectively. FIG. 14d compares the stress evolution of the LCEs during the heating process. As shown in FIG. 14d, initially, a decrease in stress was observed, which suggests a relaxation of the crosslinking network. When the temperature approached the LC-isotropic phase transition temperature, the stress increased, which is an indication of the retractive force generated by the aligned LCEs. However, the relaxation behaviors of the LCEs were not exactly the same, which was attributed to the difference in liquid crystallinity.

In order to better understand the evolution of microstructure of the LCEs during relaxation, detailed in situ SAXS/WAXS experiments were performed. FIG. 15*a* is a photo of BP-SA-10 at 100% stretch with one end fixed on the sample stage. FIGS. 15*b*-15*h* show scattering patterns for BP-SA-10 at different relaxation temperatures. In the experiment, one end of the LCE was fixed on the sample stage and scattering patterns were collected at different relaxation temperatures. Interestingly, an increase in orientation was observed when the LCE was relaxed at temperatures below the $T_{lc}$. The increase is believed to result from the release of internal stress of the crosslinking network. As mentioned previously, rotation of the LC domains is believed to be involved in the mechanical stretching, which leads to the elongation of the LCE samples. Because the LC mesogens were directly incorporated into the backbone of the polymer chains, the rotation of the LC domains was expected to result in a large deformation of the crosslinking network, which restricted the initial orientation of the LC domains to some extent. When the temperature increased, the network became softened and resulted in a perfection of the orientation. In addition, as evidenced by FIGS. 15*b*-15*e*, it can be seen that the increase in regularity is reflected not only by the increased scattering intensity from the smectic layers but also by the stronger scattering from the superstructure formed by the LC domains (the scattering arc near beam stop). This indicates that a cooperative motion of the LC domain may happen during the thermal relaxation process because there are no external forces to further align the LC domains. When the temperature became higher than $T_{lc}$, the LCE started losing its orientation, as indicated in FIGS. 15*f*, 15*g*, and 15*h*. Notably, the disruption of the LC domains started from the LC mesogens rather than the smectic layers. As can be seen in FIG. 15*f*, the ordered smectic structure was still present even though the ordering between mesogens was lost. When the temperature reached 155° C., the LC ordering completely disappeared. After cooling to room temperature, the smectic LC phase returned.

Figure 16A:
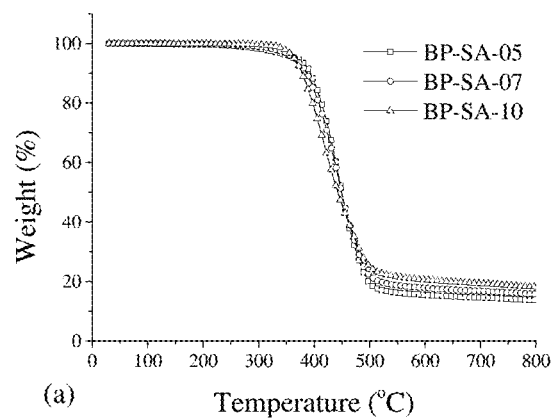
FIGS. 16a, 16b. Graphs showing thermal degradation profiles for the BP-SA-05, BP-SA-07, and BP-SA-10 LCEs, with FIG. 16a showing weight vs. temperature profiles and FIG. 16b showing the corresponding derivative thermogravimetric data (DTG) vs. temperature profiles.
Figure 16B:
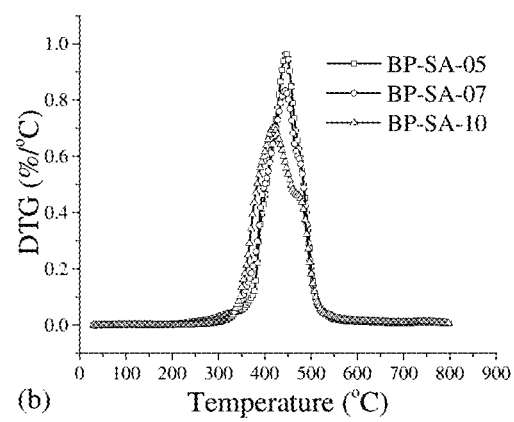

In order to better understand the structural differences, thermal stability of the LCEs was also investigated, and the results are shown in the wt % vs. temperature thermal degradation curves in FIGS. 16*a* and 16*b*, and Table 4 below for BP-SA-05, BP-SA-07, and BP-SA-10 compositions. In Table 4, $T_1$, $T_5$, and $T_{10}$ represent the temperatures where the sample lost 1%, 5%, and 10% of its initial weight, respectively. BP-SA-10 exhibited a better thermal stability at a low temperature region (<350° C.), which indicates that the disruption of the network was restricted by the relatively rigid LC domains. However, as the temperature further increased, crosslink density played a more important role than morphology, which was reflected in the higher $T_5$ and $T_{10}$ observed for BP-SA-05. The residual weight percent of the LCEs was also compared, and BP-SA-10 exhibited the highest value, which indicates a high percentage of the BP molecules, since char formation in polymer thermal decomposition is generally promoted by linear aromatic structures.

TABLE 4

Thermal stability of the LCEs determined by TGA

| LCE | $T_1$ (° C.) | $T_5$ (° C.) | $T_{10}$ (° C.) | Residual weight (%) |
|---|---|---|---|---|
| BP-SA-05 | 268.4 | 366.9 | 390.4 | 13.7 |
| BP-SA-07 | 298.4 | 364.6 | 386.8 | 15.8 |
| BP-SA-10 | 331.5 | 363.8 | 378.2 | 18.2 |

Epoxy-Lignin Liquid Crystalline Elastomer Compositions

Figure 17A:
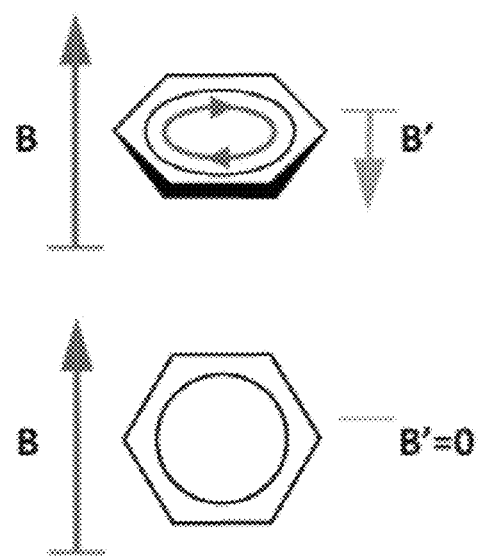
FIGS. 17a, 17b.
Figure 17B:
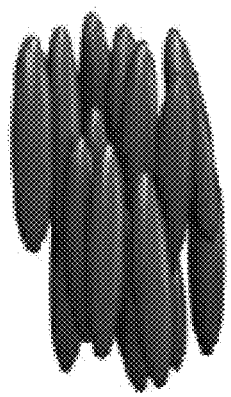
Figure 18:
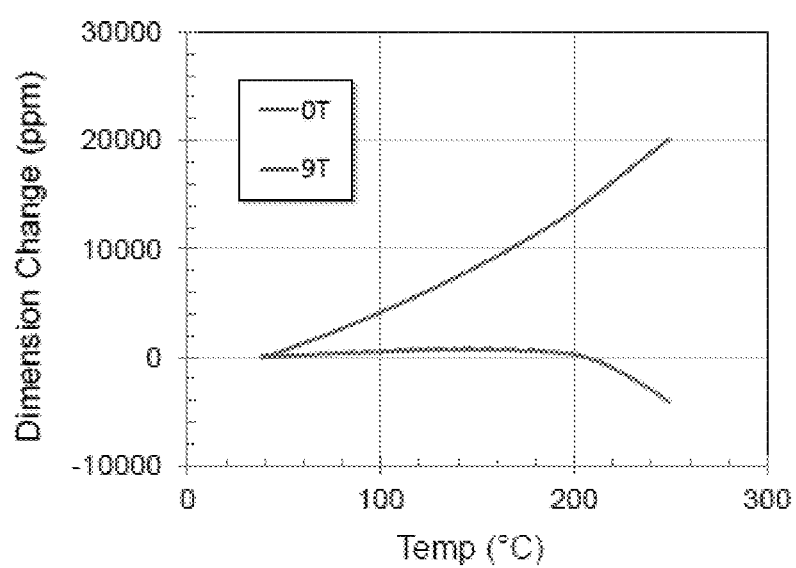
FIG. 18. Dimension change vs. temperature graphs showing deformation profile of a zero-CTE epoxy polymer after curing in a magnetic field.

Liquid crystalline aromatic epoxy materials are responsive to electromagnetic energy. A magnetic field B directed perpendicular to the plane of an aromatic system induces a ring current in the delocalized π electrons. As shown in the schematic of FIG. 17*a*, the ring current results in a magnetic field B' resulting in a force that reorients the aromatic system parallel to B. Thus, as shown in the schematic of FIG. 17*b*, it is possible to align and cure aromatic epoxy compounds in an oriented nematic or smectic phase by applying a static magnetic field. The bulk mechanical properties of such epoxies have been shown to vary by approximately 100% in specific directions (C. Tan, et al., *Macromolecules* 33, 6249-6254, 2000). As shown in the deformation profile of FIG. 18 of a zero-CTE epoxy polymer after curing in a magnetic field, synthetic liquid crystal epoxies cured under a high magnetic field exhibit a slightly negative glassy CTE. Independent studies reported in the literature have also reported comparable results (Q. Yin, et al., *BioResources* 7, 5737-5748, 2012). These bulk properties are directly related to the long-range ordering of crystalline domains, which essentially forms a texture that aligns with the magnetic field lines. These unique cross-linking dynamics can be used to design zero-CTE epoxy materials for additive manufacturing eliminating thermally induced deformation.

For over a decade, additive manufacturing existed under a niche market known as rapid prototyping, since components made using these methods had the dimensions and proportions of real parts, yet had substandard mechanical properties that failed to perform in engineering applications. Fused deposition modeling (FDM) has stringent material requirements to ensure minimal part distortion and sufficient mechanical properties for modern engineering applications. FDM requires that a layer maintains tolerance immediately after deposition along with a structural bond to subsequent layers. The problem is compounded if the parts are to be built out-of-the-box under transient conditions. Ideally, materials are spatially locked in place immediately after deposition and maintain tolerance during thermal cycling since out-of-the-box heating requires localized deposition of energy to promote layer to layer bonding. A new class of multi-component FDM epoxy polymers with a broad thermal activation window facilitates a rapid prepolymer formation at slightly elevated temperatures without fully crosslinking the epoxy. The polymer is prepared from an epoxy blend with rapid and latent cross-linking agents, such as an aromatic amine and a polyphenol. The prepolymer is then processed into extrusion-ready pellets, which can be supplied into an FDM system. Localized electromagnetic energy (AC field heating, microwave heating, IR lamp, etc.) is used to develop aligned liquid crystalline domains and to fully cure the material. A wide thermal activation window is the feature required to initially immobilize the polymer material, while allowing electromagnetic control during the development of the inherent microstructure followed by thermal curing. In order to achieve performance competitive with conventional engineering materials, compounding with other reinforcing agents, such as glass or carbon fibers, is generally required.

Although recently developed material solutions have shown significant increases in mechanical properties in the build plane, an inherent limitation associated with the incorporation of reinforcing agents into thermoplastics is a substantial decrease in z-strength resulting from additional resistance to flow. Unfortunately, the reinforcing agent distributions that most effectively increase strength also increase the viscosity of the polymer melt. The typical engineering solution is to compromise strength by reducing the ideal fraction and distribution of reinforcing agents in order to attain manageable rheological properties or add plasticizers that further weaken the polymer. Reactive polymers can circumvent this limitation by forming strong chemical bonds across layers (in the z-direction) after deposition.

Commercially available epoxy precursors may include aromatic epoxies (i.e. epoxy bisphenol A) or aromatic/aliphatic epoxies. The aromaticity enhances the microstructure development under magnetic fields while the aliphatic segments lower the viscosity of an epoxy enhancing the processability. The epoxy is blended with a limited quantity of an aromatic amine curing agent to obtain a partially reacted prepolymer at moderate temperatures (near room temperature) and a second less reactive phenolic curing agent for high temperature curing. This strategy results in a broad thermal activation range, which allows extrusion and deposition at lower temperatures and final curing at higher temperatures. The aromaticity of both epoxy and curing agent, as well as functional groups, i.e., the ratio of primary amine and hydroxyl groups, is tuned for the desired extrudability and subsequent high temperature curing. Incorporation of aromatic segments without sacrificing extrudability and while maintaining the capability to rapidly cure at high temperature under a magnetic field is a critical feature for obtaining zero-CTE composites. After deposition, electromagnetic processing allows development of a crystalline microstructure followed by curing under controlled localized heating.

Figure 19A:
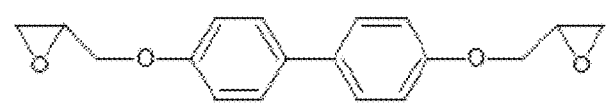
Figure 19B:
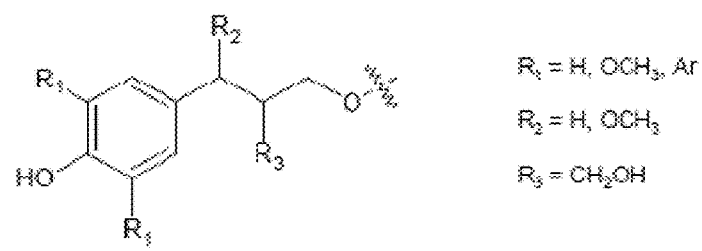
Figure 19C:
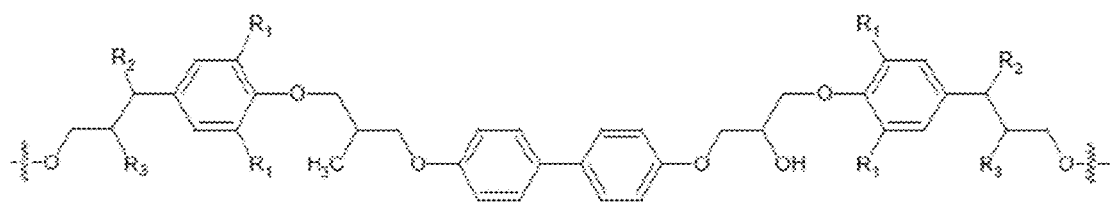
Figure 20:
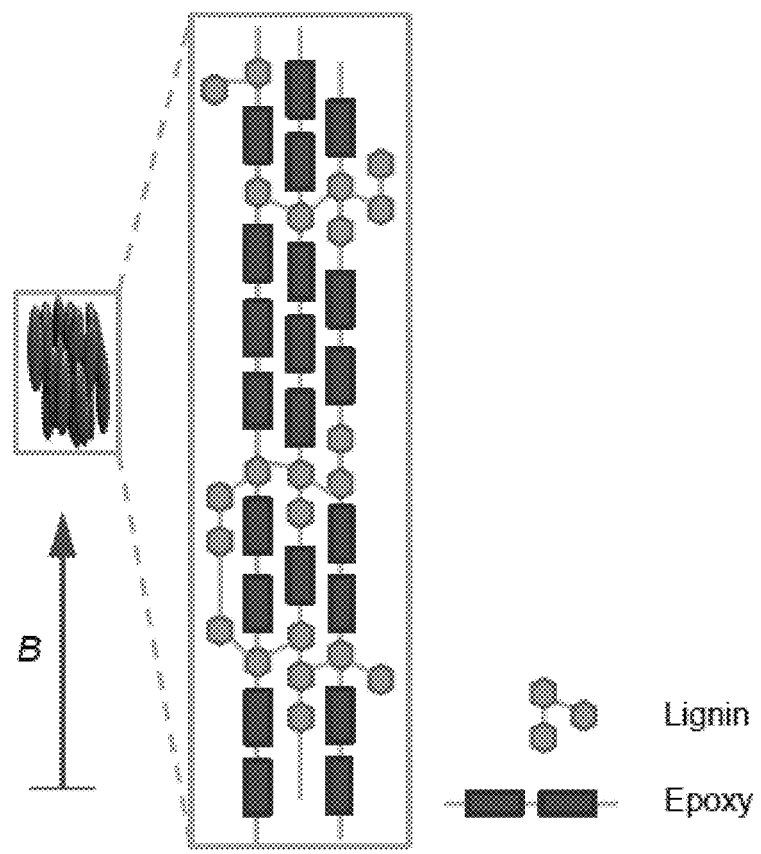
FIG. 20. Depiction of an externally applied magnetic field B aligning the lignin epoxy polymer in a nematic phase during crosslinking.

The status-quo in polymer additive manufacturing is thermoplastic polymers that are inherently low cost. Epoxy polymers are significantly more expensive than nylon, and glassy polymers, such as acrylonitrile butadiene styrene (ABS), are less environmentally compatible. Lignin can be used as an integral component of a zero-CTE biopolymer epoxy composite by thermally crosslinking the phenolic hydroxyl functionalities of lignin with aromatic epoxies. An example of a potential crosslinking reaction is shown in FIGS. 19a-19c, wherein FIG. 19a depicts a representative epoxy molecule, FIG. 19b depicts free aromatic hydroxyl functional groups of lignin, and FIG. 19c depicts a crosslinked biopolymer epoxy-lignin product. The linear aromatic moieties result in diamagnetic anisotropy, which enables alignment of polymer molecules in a magnetic field. As shown in FIG. 20, reactive crosslinking preserves the molecular orientation resulting in a nematic crystalline phase with low CTE characteristics.

The strength of this biopolymer epoxy can be significantly increased by compounding with glass fibers, Kevlar® or carbon fibers. Such reinforcing agents increase the tensile strength by approximately one order of magnitude. The resulting blend is processed into pellets, which can be extruded at room temperature and thermally cured.

The epoxy may be combined with lignin biopolymers as an integral aromatic crosslinking agent to obtain a low-cost biopolymer epoxy composite material. Combining synthetic with natural polymer materials provides a way to reduce cost and to obtain new composite materials combining benefits from both components.

Figure 21:
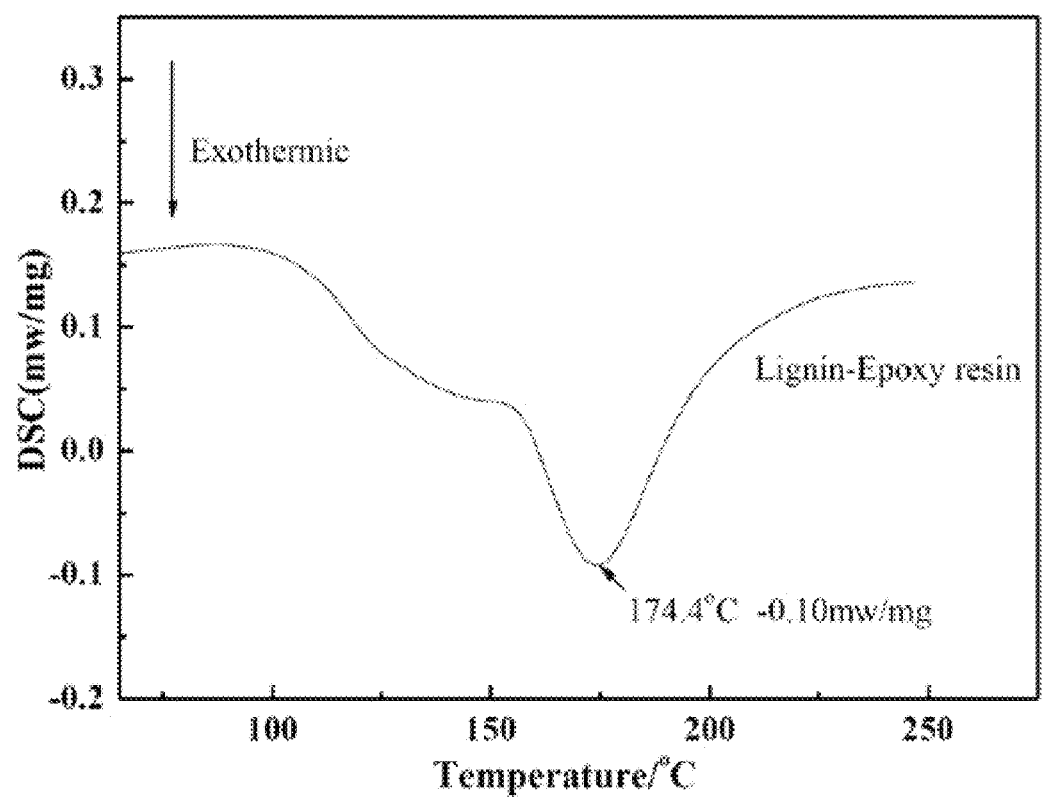
FIG. 21. Graphs showing DSC data for a lignin-epoxy blend showing partial curing at temperatures <150° C. Figure reproduced from Yin, et al., *BioResources* 7, 5737-5748, 2012.

This approach takes advantage of abundant aliphatic and phenolic hydroxyl functional groups (for example, Alcell lignin contains 3.7-3.9 mmol/g phenolic hydroxyls, ~6 mmol/g total) to crosslink the lignin biopolymer with the epoxy. After blending with a lignin biopolymer, the epoxy is processed into pellets. A softwood lignin (high $T_g$, high reactivity) or a hardwood lignin (low $T_g$, low reactivity), or both, affects the thermal processing window, curing temperature, and kinetics and mechanical stability. FIG. 21 shows an example of an experimental DSC profile for the curing reaction of a lignin-epoxy blend, as reproduced from Q. Yin, et al., *BioResources* 7, 5737-5748, 2012. The shoulder below 150° C. indicates partial curing of the epoxy with polyphenol functional groups in lignin. Further heating above 150° C. results in the main exothermic peak at 174.4° C. yielding the final thermoset. The example shows that it is possible to obtain a partially cured lignin-epoxy blend with sufficient viscosity for the production of pellets. After extrusion and deposition in the FDM system, the polymer is cured by heating to a temperature >170° C. Epoxy blends with higher fractions of lignin are expected to reduce mechanical strength. Glass fibers, carbon fiber, or Kevlar® can be used as additives to obtain reinforced composites with superior modulus and tensile strength.

While there have been shown and described what are at present considered the preferred embodiments of the invention, those skilled in the art may make various changes and modifications which remain within the scope of the invention defined by the appended claims.

What is claimed is:

1. A liquid crystalline elastomer composition comprising aromatic diepoxy units crosslinked with alkylene diacid units having alkylene segments containing at least one methylene unit, wherein the aromatic diepoxy units and alkylene diacid units are in a molar ratio of 0.5 to 0.7.

2. The composition of claim 1, wherein said aromatic diepoxy units possess at least two phenyl rings connected by a covalent bond or fused with each other.

3. The composition of claim 1, wherein said aromatic diepoxy units possess at least three phenyl rings connected by a covalent bond and/or fused with each other.

4. The composition of claim 1, wherein said alkylene diacid units have alkylene segments containing at least three and up to ten methylene units.

5. The composition of claim 1, wherein said aromatic diepoxy units possess at least two phenyl rings connected by a covalent bond or fused with each other and said alkylene diacid units have alkylene segments containing at least three and up to ten methylene units.

6. A method of additive manufacturing, the method comprising feeding the liquid crystalline elastomer composition of claim 1 into an additive manufacturing device to produce an object made of said liquid crystalline elastomer composition.

7. The method of claim 6, wherein said aromatic diepoxy units possess at least two phenyl rings connected by a covalent bond or fused with each other.

8. The method of claim 6, wherein said aromatic diepoxy units possess at least three phenyl rings connected by a covalent bond and/or fused with each other.

9. The method of claim 6, wherein said alkylene diacid units have alkylene segments containing at least three and up to ten methylene units.

10. The method of claim 6, wherein said aromatic diepoxy units possess at least two phenyl rings connected by a covalent bond or fused with each other and said alkylene diacid units have alkylene segments containing at least three and up to ten methylene units.

11. The composition of claim 1, wherein said aromatic diepoxy units are derived from aromatic diepoxy molecules having the following structure:

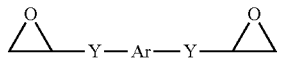

wherein Ar is an aromatic portion and the Y groups independently represent a covalent bond or a linking group.

12. A method of producing a liquid crystalline elastomer composition, the method comprising crosslinking aromatic diepoxy molecules with alkylene diacid molecules containing at least one methylene unit at a processing temperature of at least 120° C. to 250° C., wherein the aromatic diepoxy molecules and alkylene diacid molecules are in a molar ratio of 0.5 to 0.7.

13. The method of claim 12, wherein said aromatic diepoxy molecules have the following structure:

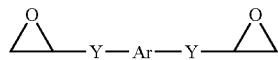

wherein Ar is an aromatic portion and the Y groups independently represent a covalent bond or a linking group.

14. The method of claim 12, wherein said aromatic diepoxy molecules possess at least two phenyl rings connected by a covalent bond or fused with each other.

15. The method of claim 12, wherein said aromatic diepoxy molecules possess at least three phenyl rings connected by a covalent bond and/or fused with each other.

16. The method of claim 12, wherein said alkylene diacid molecules have alkylene segments containing at least three and up to ten methylene units.

17. The method of claim 12, wherein said aromatic diepoxy molecules possess at least two phenyl rings connected by a covalent bond or fused with each other and said alkylene diacid molecules have alkylene segments containing at least three and up to ten methylene units.

* * * * *